US010314085B2

(12) United States Patent
Ouyang et al.

(10) Patent No.: US 10,314,085 B2
(45) Date of Patent: Jun. 4, 2019

(54) PROSE INFORMATION TRANSMISSION METHOD, TERMINAL, AND COMMUNICATIONS DEVICE

(71) Applicant: Huawei Technologies Co., Ltd., Shenzhen (CN)

(72) Inventors: Guowei Ouyang, Beijing (CN); Hui Jin, Beijing (CN); Qiang Yi, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 36 days.

(21) Appl. No.: 15/311,599

(22) PCT Filed: May 16, 2014

(86) PCT No.: PCT/CN2014/077708
§ 371 (c)(1),
(2) Date: Nov. 16, 2016

(87) PCT Pub. No.: WO2015/172394
PCT Pub. Date: Nov. 19, 2015

(65) Prior Publication Data
US 2017/0086232 A1    Mar. 23, 2017

(51) Int. Cl.
*H04W 76/10*    (2018.01)
*H04W 4/70*    (2018.01)
(Continued)

(52) U.S. Cl.
CPC ............ *H04W 76/10* (2018.02); *H04W 4/70* (2018.02); *H04W 8/005* (2013.01); *H04W 16/26* (2013.01);
(Continued)

(58) Field of Classification Search
CPC ..... H04W 88/04; H04W 16/26; H04W 4/005; H04W 76/00; H04W 76/02; H04W 8/005; H04W 4/70; H04W 76/10; H04W 84/042
See application file for complete search history.

(56) References Cited

U.S. PATENT DOCUMENTS 8,538,458 B2    9/2013    Haney
2013/0287012 A1    10/2013    Pragada et al.
(Continued)

FOREIGN PATENT DOCUMENTS

CN    103634812 A    3/2014
WO    2013095000 A    6/2013
(Continued)

OTHER PUBLICATIONS

"Update on ProSe Direct Discovery via the Serving PLMN," SA WG2 Meeting #101bis, S2-140624, Feb. 17-21, 14 pages.
(Continued)

*Primary Examiner* — Charles C Jiang
*Assistant Examiner* — Rosene Clark
(74) *Attorney, Agent, or Firm* — Conley Rose, P.C.

(57) ABSTRACT

A ProSe information transmission method for a second terminal discovering a first terminal in a roaming state. The method includes: a first ProSe entity receives a first message sent by a first terminal, where the first message carries a ProSe application identity APP ID; sends a second message carrying the ProSe APP ID to a second ProSe entity; receives a third message carrying a first identity sent by the second ProSe entity, the first identity is a codeword or mask allocated to the ProSe APP ID by the second ProSe entity, and the first identity includes a PLMN ID of the VPLMN; generates a second identity according to the first identity, where the second identity includes the first identity and a PLMN ID of an HPLMN of the first terminal; and sends a
(Continued)

fourth message to the first terminal, where the fourth message carries the second identity.

12 Claims, 15 Drawing Sheets

(51) Int. Cl.
  *H04W 16/26* (2009.01)
  *H04W 76/00* (2018.01)
  *H04W 88/04* (2009.01)
  *H04W 8/00* (2009.01)
  *H04W 84/04* (2009.01)

(52) U.S. Cl.
  CPC ........... *H04W 76/00* (2013.01); *H04W 88/04* (2013.01); *H04W 84/042* (2013.01)

(56) References Cited

U.S. PATENT DOCUMENTS

| | | | |
|---|---|---|---|
| 2013/0288668 A1 | 10/2013 | Pragada et al. | |
| 2014/0341121 A1* | 11/2014 | Chang | H04W 8/005 370/329 |
| 2014/0341132 A1* | 11/2014 | Kim | H04W 8/005 370/329 |
| 2015/0230076 A1* | 8/2015 | Hedman | H04W 8/005 370/254 |
| 2015/0271675 A1* | 9/2015 | Cheng | H04W 8/005 455/410 |
| 2015/0289127 A1* | 10/2015 | Ou | H04W 8/005 455/426.1 |
| 2015/0326738 A1* | 11/2015 | Li | H04L 12/1403 455/406 |
| 2016/0119769 A1* | 4/2016 | Gustafsson | H04L 67/16 370/329 |
| 2016/0302062 A1* | 10/2016 | Lehtovirta | H04W 76/10 |
| 2017/0079086 A1* | 3/2017 | Kuge | H04W 76/14 |
| 2017/0105119 A1* | 4/2017 | Babbage | H04L 9/0816 |
| 2017/0195905 A1* | 7/2017 | Jung | H04W 24/08 |

FOREIGN PATENT DOCUMENTS

| | | |
|---|---|---|
| WO | 2013191504 A1 | 12/2013 |
| WO | 2014067573 A1 | 5/2014 |
| WO | 2014071140 A2 | 5/2014 |

OTHER PUBLICATIONS

"Clarification on ProSe Direct Discovery Procedures in Roaming Case," Change Request, SA WG2 Meeting #103, S2-141842, May 19-23, 2014, 6 pages.

"3rd Generation Partnership Project; Technical Specification Group Services and System Aspects; Proximity-based service (ProSe); Stage 2 (Release 12)," 3GPP TS 23.303, V12.0.0, Feb. 2014, 53 pages.

Foreign Communication From a Counterpart Application, European Application No. 14891847.7, Extended European Search Report dated May 12, 2017, 9 pages.

Foreign Communication From a Counterpart Application, PCT Application No. PCT/CN2014/077708, English Translation of International Search Report dated Feb. 4, 2015, 2 pages.

Foreign Communication From a Counterpart Application, PCT Application No. PCT/CN2014/077708, English Translation of Written Opinion dated Feb. 4, 2015, 7 pages.

Ericsson, "LS on WLAN signal measurements for WLAN/3GPP Radio interworking," R2-141842, 3GPP TSG-RAN2 Meeting #85bis, Mar. 31-Apr. 4, 2014, 1 page.

Foreign Communication From a Counterpart Application, Chinese Application No. 201480004983.4, Chinese Office Action dated Aug. 3, 2018, 7 pages.

* cited by examiner

PROSE INFORMATION TRANSMISSION METHOD, TERMINAL, AND COMMUNICATIONS DEVICE

CROSS-REFERENCE TO RELATED APPLICATIONS

This application is a national stage application of international patent application number PCT/CN2014/077708 filed on May 16, 2014, which is incorporated by reference.

TECHNICAL FIELD

The present disclosure relates to the communications field, and in particular, to a proximity service (ProSe) information transmission method, a terminal, and a communications device.

BACKGROUND

In a conventional mobile network, a data communication path between terminals needs to pass through a core network entity such as a serving gateway (SGW)/a packet data gateway (PGW). Therefore, even when data is transferred between two terminals that are very close to each other, the data needs to be transferred through a core network. Consequently, a required amount of network transmission bandwidth is relatively large, and transmission efficiency is relatively low.

To resolve this problem, a ProSe subject is proposed. ProSe requires that data exchange be directly performed between terminals, or data exchange is performed through only a base station but not the core network entity such as an SGW/a PGW. Therefore, communication efficiency between terminals that are relatively close to each other can be improved.

To implement direct communication between terminals, two terminals need to perform mutual discovery. In some approaches, when two terminals perform mutual discovery, and when a first terminal registers with a network that can be listened on by a second terminal, to perform broadcasting, a codeword that is of a ProSe application (APP) identity (ID) and that is broadcast by the first terminal is obtained from a home public land mobile network (HPLMN) of the first terminal, and carries PLMN ID information of the HPLMN of the first terminal; a codeword or mask that is of a ProSe APP ID and that is obtained through listening by the second terminal is obtained from the network that can be listened on by the second terminal, and carries PLMN ID information of the network that can be listened on by the second terminal. However, a PLMN ID of the HPLMN of the first terminal may be different from a PLMN ID of the network that can be listened on by the second terminal. Therefore, in a terminal discovery process in a roaming scenario, in a process of listening to the codeword of the ProSe APP ID by the second terminal in the network that can be listened on by the second terminal, the PLMN ID of the HPLMN of the first terminal cannot match the PLMN ID of the network that can be listened on by the second terminal, and consequently the second terminal cannot obtain, through listening, the codeword that is of the ProSe APP ID and that is broadcast by the first terminal. As a result, the first terminal is ignored, and the second terminal cannot acquire ProSe application information, for example, information such as an address, a phone number, and/or a discount, broadcast by the first terminal, which ultimately results in that the second terminal cannot discover the first terminal.

SUMMARY

Embodiments of the present disclosure provide a ProSe information transmission method, a terminal, and a communications device, so that a second terminal can discover a first terminal that is in a roaming state.

To achieve the foregoing purpose, the embodiments of the present disclosure provide the following solutions:

According to a first aspect, a ProSe information transmission method is provided, where the method includes: receiving, by a first proximity service ProSe entity, a first message sent by a first terminal, where the first message carries a ProSe application identity APP ID, and the first ProSe entity is a ProSe entity in a home public land mobile network HPLMN of the first terminal; sending a second message to a second ProSe entity, where the second message carries the ProSe APP ID, and the second ProSe entity is a ProSe entity in a visited public land mobile network VPLMN of the first terminal; receiving a third message sent by the second ProSe entity, where the third message carries a first identity, the first identity is a codeword or mask allocated to the ProSe APP ID by the second ProSe entity, and the first identity includes a public land mobile network identity PLMN ID of the VPLMN; generating a second identity according to the first identity, where the second identity includes the first identity and a PLMN ID of the HPLMN of the first terminal; and sending a fourth message to the first terminal, where the fourth message carries the second identity.

In a first possible implementation manner of the first aspect, with reference to the first aspect, if the first identity is the codeword of the ProSe APP ID, the generating a second identity according to the first identity includes: generating the second identity according to the codeword of the ProSe APP ID, where the second identity includes the codeword of the ProSe APP ID and the PLMN ID of the HPLMN.

In a second possible implementation manner of the first aspect, with reference to the first aspect, if the first identity is the mask of the ProSe APP ID, the generating a second identity according to the first identity includes: allocating a codeword corresponding to the ProSe App. ID to the mask of the ProSe APP ID; and generating the second identity according to the codeword of the ProSe APP ID, where the second identity includes the codeword of the ProSe APP ID and the PLMN ID of the HPLMN.

In a third possible implementation manner of the first aspect, with reference to the first aspect to the second possible implementation manner of the first aspect, the first message further carries a first terminal identity of the first terminal; and before the sending a second message to a second ProSe entity, the method further includes: acquiring first authentication information of the first terminal according to the first terminal identity, where the first authentication information includes information used for indicating whether the first terminal can perform broadcasting; and determining, according to the first authentication information, that the first terminal can perform broadcasting.

In a fourth possible implementation manner of the first aspect, with reference to the third possible implementation manner of the first aspect, the second message further carries the first terminal identity, so that the second ProSe entity determines, according to the first terminal identity, whether the first terminal can perform broadcasting in the VPLMN; and the receiving a third message sent by the second ProSe entity is receiving the third message that is sent by the second ProSe entity in a case in which it is determined that the first terminal can perform broadcasting in the VPLMN.

In a fifth possible implementation manner of the first aspect, with reference to the first aspect to the fourth possible implementation manner of the first aspect, before the generating a second identity according to the first identity, the method further includes: acquiring roaming indication information, where the roaming indication information is used for indicating whether the first terminal is in a roaming state; and if the roaming indication information indicates that the first terminal is in the roaming state, determining, according to second indication information, that the first terminal supports broadcasting of the second identity, where the second indication information is used for indicating whether the first terminal can support broadcasting of the second identity.

According to a second aspect, a ProSe information transmission method is provided, where the method includes: receiving, by a second proximity service ProSe entity, a second message sent by a first ProSe entity, where the second message carries a ProSe application identity APP ID, the first ProSe entity is a ProSe entity in a home public land mobile network HPLMN of a first terminal, and the second ProSe entity is a ProSe entity in a visited public land mobile network VPLMN of the first terminal; allocating a corresponding codeword or mask to the ProSe APP ID, where the codeword or mask of the ProSe APP ID includes a public land mobile network identity PLMN ID of the VPLMN; and sending a third message to the first ProSe entity, where the third message carries a first identity, and the first identity is the codeword or mask allocated to the ProSe APP ID by the second ProSe entity.

In a first possible implementation manner of the second aspect, with reference to the second aspect, the method further includes: receiving, by the second ProSe entity, a fifth message sent by a second terminal after the second terminal acquires a second identity that is generated by the first ProSe entity according to the first identity, where the fifth message carries the second identity, and the second identity includes the first identity and a PLMN ID of the HPLMN of the first terminal; sending a seventh message to the first ProSe entity according to the PLMN ID of the HPLMN included in the second identity, where the seventh message carries the second identity; receiving an eighth message that is sent by the first ProSe entity after the first ProSe entity determines the ProSe APP ID according to the second identity, where the eighth message carries the ProSe APP ID; and sending a sixth message to the second terminal, where the sixth message carries the ProSe APP ID.

In a second possible implementation manner of the second aspect, with reference to the second aspect, the ProSe APP ID includes: a PLMN ID of the HPLMN of the first terminal; and after the allocating a corresponding codeword to the ProSe APP ID, the method further includes: storing a correspondence between the PLMN ID of the HPLMN of the first terminal and the codeword of the ProSe APP ID; receiving a fifth message sent by a second terminal after the second terminal acquires a third identity, where the fifth message carries the third identity, and the third identity is the codeword allocated to the ProSe application identity APP ID by the second ProSe entity; determining, according to the correspondence, the PLMN ID that is of the HPLMN and that is corresponding to the third identity; sending a seventh message to the first ProSe entity according to the PLMN ID that is of the HPLMN and that is corresponding to the third identity, where the seventh message carries the third identity; receiving an eighth message that is sent by the first ProSe entity after the first ProSe entity determines the ProSe APP ID according to the third identity, where the eighth message carries the ProSe APP ID; and sending a sixth message to the second terminal, where the sixth message carries the ProSe APP ID.

According to a third aspect, a ProSe information transmission method is provided, where the method includes: receiving, by a first proximity service ProSe entity, a first message sent by a first terminal, where the first message carries a ProSe application identity APP ID, and the first ProSe entity is a ProSe entity in a home public land mobile network HPLMN of the first terminal; sending a second message to a second ProSe entity, where the second message carries the ProSe APP ID, and the second ProSe entity is a ProSe entity in a visited public land mobile network VPLMN of the first terminal; receiving a third message sent by the second ProSe entity, where the third message carries a third identity, the third identity is a codeword allocated to the ProSe APP ID by the second ProSe entity, and the third identity includes a public land mobile network identity PLMN ID of the VPLMN; and sending a fourth message to the first terminal, where the fourth message carries the third identity.

According to a fourth aspect, a ProSe information transmission method is provided, where the method includes: sending, by a first terminal, a first message to a first proximity service ProSe entity, where the first message carries a preconfigured ProSe application identity APP ID, and the first ProSe entity is a ProSe entity in a home public land mobile network HPLMN of the first terminal; receiving a fourth message sent by the first ProSe entity, where the fourth message carries a second identity, the second identity includes a first identity and a public land mobile network identity PLMN ID of the HPLMN, the first identity is a codeword or mask allocated to the ProSe APP ID by a second ProSe entity, the first identity includes a PLMN ID of a visited public land mobile network VPLMN of the first terminal, and the second ProSe entity is a ProSe entity in the VPLMN; and broadcasting the second identity.

In a first possible implementation manner of the fourth aspect, with reference to the fourth aspect, the first message further carries first indication information, where the first indication information is used for representing whether the first terminal supports broadcasting of the second identity.

According to a fifth aspect, a ProSe information transmission method is provided, where the method includes: acquiring, by a second terminal, a second identity, where the second identity includes a first identity and a public land mobile network identity PLMN ID of a home public land mobile network HPLMN of a first terminal, the first identity is a codeword or mask allocated to a ProSe application identity APP ID by a second proximity service ProSe entity, the first identity includes a PLMN ID of a visited public land mobile network VPLMN of the first terminal, and the second ProSe entity is a ProSe entity in the VPLMN; sending a fifth message to the second ProSe entity according to the PLMN ID of the VPLMN included in the second identity, where the fifth message carries the second identity; and receiving a sixth message sent by the second ProSe entity, where the sixth message carries the ProSe APP ID, the ProSe APP ID is determined by the first ProSe entity according to the second identity carried in a seventh message that is sent by the second ProSe entity to the first ProSe entity according to the PLMN ID of the HPLMN of the first terminal included in the second identity, and the first ProSe entity is a ProSe entity in the HPLMN of the first terminal.

According to a sixth aspect, a device for implementing functions of a first proximity service ProSe entity is provided, where the first ProSe entity is a ProSe entity in a home public land mobile network HPLMN of a first terminal, and the device includes a receiver, a transmitter, and a processor, where: the receiver is configured to receive a first message sent by the first terminal, where the first message carries a ProSe application identity APP ID; the transmitter is configured to send a second message to a second ProSe entity, where the second message carries the ProSe APP ID, and the second ProSe entity is a ProSe entity in a visited public land mobile network VPLMN of the first terminal; the receiver is further configured to receive a third message sent by the second ProSe entity, where the third message carries a first identity, the first identity is a codeword or mask allocated to the ProSe APP ID by the second ProSe entity, and the first identity includes a public land mobile network identity PLMN ID of the VPLMN; the processor is configured to generate a second identity according to the first identity, where the second identity includes the first identity and a PLMN ID of the HPLMN of the first terminal; and the transmitter is further configured to send a fourth message to the first terminal, where the fourth message carries the second identity.

In a first possible implementation manner of the sixth aspect, with reference to the sixth aspect, if the first identity is the codeword of the ProSe APP ID, the processor is configured to: generate the second identity according to the codeword of the ProSe APP ID, where the second identity includes the codeword of the ProSe APP ID and the PLMN ID of the HPLMN.

In a second possible implementation manner of the sixth aspect, with reference to the sixth aspect, if the first identity is the mask of the ProSe APP ID, the processor is configured to: allocate a codeword corresponding to the ProSe App. ID to the mask of the ProSe APP ID; and generate the second identity according to the codeword of the ProSe APP ID, where the second identity includes the codeword of the ProSe APP ID and the PLMN ID of the HPLMN.

In a third possible implementation manner of the sixth aspect, with reference to the sixth aspect to the second possible implementation manner of the sixth aspect, the first message further carries a first terminal identity of the first terminal; the processor is further configured to acquire first authentication information of the first terminal according to the first terminal identity before the transmitter sends the second message to the second ProSe entity, where the first authentication information includes information used for indicating whether the first terminal can perform broadcasting; and the processor is further configured to determine, according to the first authentication information, that the first terminal can perform broadcasting.

In a fourth possible implementation manner of the sixth aspect, with reference to the third possible implementation manner of the sixth aspect, the second message further carries the first terminal identity, so that the second ProSe entity determines, according to the first terminal identity, whether the first terminal can perform broadcasting in the VPLMN; and the receiver is configured to: receive the third message that is sent by the second ProSe entity in a case in which it is determined that the first terminal can perform broadcasting in the VPLMN.

In a fifth possible implementation manner of the sixth aspect, with reference to the sixth aspect to the fourth possible implementation manner of the sixth aspect, the processor is further configured to acquire roaming indication information before generating the second identity according to the first identity, where the roaming indication information is used for indicating whether the first terminal is in a roaming state; and the processor is further configured to: if the roaming indication information indicates that the first terminal is in the roaming state, determine, according to second indication information, that the first terminal supports broadcasting of the second identity, where the second indication information is used for indicating whether the first terminal can support broadcasting of the second identity.

According to a seventh aspect, a device for implementing functions of a second proximity service ProSe entity is provided, where the second ProSe entity is a ProSe entity in a visited public land mobile network VPLMN of a first terminal, and the device includes a receiver, a processor, and a transmitter, where: the receiver is configured to receive a second message sent by a first ProSe entity, where the second message carries a ProSe application identity APP ID, and the first ProSe entity is a ProSe entity in a home public land mobile network HPLMN of the first terminal; the processor is configured to allocate a corresponding codeword or mask to the ProSe APP ID, where the codeword or mask of the ProSe APP ID includes a public land mobile network identity PLMN ID of the VPLMN; and the transmitter is configured to send a third message to the first ProSe entity, where the third message carries a first identity, and the first identity is the codeword or mask allocated to the ProSe APP ID by the second ProSe entity.

In a first possible implementation manner of the seventh aspect, with reference to the seventh aspect, the receiver is further configured to receive a fifth message sent by a second terminal after the second terminal acquires a second identity that is generated by the first ProSe entity according to the first identity, where the fifth message carries the second identity, and the second identity includes the first identity and a PLMN ID of the HPLMN of the first terminal; the transmitter is further configured to send a seventh message to the first ProSe entity according to the PLMN ID of the HPLMN included in the second identity, where the seventh message carries the second identity; the receiver is further configured to receive an eighth message that is sent by the first ProSe entity after the first ProSe entity determines the ProSe APP ID according to the second identity, where the eighth message carries the ProSe APP ID; and the transmitter is further configured to send a sixth message to the second terminal, where the sixth message carries the ProSe APP ID.

In a second possible implementation manner of the seventh aspect, with reference to the seventh aspect, the ProSe APP ID includes: a PLMN ID of the HPLMN of the first terminal; and the device further includes a memory, where the memory is configured to store a correspondence between the PLMN ID of the HPLMN of the first terminal and the codeword of the ProSe APP ID after the processor allocates the corresponding codeword to the ProSe APP ID; the receiver is further configured to receive a fifth message sent by a second terminal after the second terminal acquires a third identity, where the fifth message carries the third identity, and the third identity is the codeword allocated to the ProSe application identity APP ID by the second ProSe entity; the processor is further configured to determine, according to the correspondence, the PLMN ID that is of the HPLMN and that is corresponding to the third identity; the transmitter is further configured to send a seventh message to the first ProSe entity according to the PLMN ID that is of the HPLMN and that is corresponding to the third identity, where the seventh message carries the third identity; the receiver is further configured to receive an eighth message that is sent by the first ProSe entity after the first ProSe entity determines the ProSe APP ID according to the third identity, where the eighth message carries the ProSe APP ID; and the transmitter is further configured to send a sixth message to the second terminal, where the sixth message carries the ProSe APP ID.

According to an eighth aspect, a device for implementing functions of a first proximity service ProSe entity is provided, where the first ProSe entity is a ProSe entity in a home public land mobile network HPLMN of a first terminal, and the first ProSe entity includes a receiver and a transmitter, where: the receiver is configured to receive a first message sent by the first terminal, where the first message carries a ProSe application identity APP ID; the transmitter is configured to send a second message to a second ProSe entity, where the second message carries the ProSe APP ID, and the second ProSe entity is a ProSe entity in a visited public land mobile network VPLMN of the first terminal; the receiver is further configured to receive a third message sent by the second ProSe entity, where the third message carries a third identity, the third identity is a codeword allocated to the ProSe APP ID by the second ProSe entity, and the third identity includes a public land mobile network identity PLMN ID of the VPLMN; and the transmitter is further configured to send a fourth message to the first terminal, where the fourth message carries the third identity.

According to a ninth aspect, a first terminal is provided, where the first terminal includes a transmitter, a receiver, and a processor, where: the transmitter is configured to send a first message to a first proximity service ProSe entity, where the first message carries a preconfigured ProSe application identity APP ID, and the first ProSe entity is a ProSe entity in a home public land mobile network HPLMN of the first terminal; the receiver is configured to receive a fourth message sent by the first ProSe entity, where the fourth message carries a second identity, the second identity includes a first identity and a public land mobile network identity PLMN ID of the HPLMN, the first identity is a codeword or mask allocated to the ProSe APP ID by a second ProSe entity, the first identity includes a PLMN ID of a visited public land mobile network VPLMN of the first terminal, and the second ProSe entity is a ProSe entity in the VPLMN; and the processor is configured to broadcast the second identity.

In a first possible implementation manner of the ninth aspect, with reference to the ninth aspect, the first message further carries first indication information, where the first indication information is used for representing whether the first terminal supports broadcasting of the second identity.

According to a tenth aspect, a second terminal is provided, where the second terminal includes a processor, a transmitter, and a receiver, where: the processor is configured to acquire a second identity, where the second identity includes a first identity and a public land mobile network identity PLMN ID of a home public land mobile network HPLMN of a first terminal, the first identity is a codeword or mask allocated to a ProSe application identity APP ID by a second proximity service ProSe entity, the first identity includes a PLMN ID of a visited public land mobile network VPLMN of the first terminal, and the second ProSe entity is a ProSe entity in the VPLMN; the transmitter is configured to send a fifth message to the second ProSe entity according to the PLMN ID of the VPLMN included in the second identity, where the fifth message carries the second identity; and the receiver is configured to receive a sixth message sent by the second ProSe entity, where the sixth message carries the ProSe APP ID, the ProSe APP ID is determined by the first ProSe entity according to the second identity carried in a seventh message that is sent by the second ProSe entity to the first ProSe entity according to the PLMN ID of the HPLMN of the first terminal included in the second identity, and the first ProSe entity is a ProSe entity in the HPLMN of the first terminal.

According to an eleventh aspect, a device for implementing functions of a first proximity service ProSe entity is provided, where the first ProSe entity is a ProSe entity in a home public land mobile network HPLMN of a first terminal, and the device includes a receiving unit, a sending unit, and a generating unit, where the receiving unit is configured to receive a first message sent by the first terminal, where the first message carries a ProSe application identity APP ID; the sending unit is configured to send a second message to a second ProSe entity, where the second message carries the ProSe APP ID, and the second ProSe entity is a ProSe entity in a visited public land mobile network VPLMN of the first terminal; the receiving unit is further configured to receive a third message sent by the second ProSe entity, where the third message carries a first identity, the first identity is a codeword or mask allocated to the ProSe APP ID by the second ProSe entity, and the first identity includes a public land mobile network identity PLMN ID of the VPLMN; the generating unit is configured to generate a second identity according to the first identity, where the second identity includes the first identity and a PLMN ID of the HPLMN of the first terminal; and the sending unit is further configured to send a fourth message to the first terminal, where the fourth message carries the second identity.

In a first possible implementation manner of the eleventh aspect, with reference to the eleventh aspect, if the first identity is the codeword of the ProSe APP ID, the generating unit is configured to: generate the second identity according to the codeword of the ProSe APP ID, where the second identity includes the codeword of the ProSe APP ID and the PLMN ID of the HPLMN.

In a second possible implementation manner of the eleventh aspect, with reference to the eleventh aspect, if the first identity is the mask of the ProSe APP ID, the generating unit is configured to: allocate a codeword corresponding to the ProSe App. ID to the mask of the ProSe APP ID; and generate the second identity according to the codeword of the ProSe APP ID, where the second identity includes the codeword of the ProSe APP ID and the PLMN ID of the HPLMN.

In a third possible implementation manner of the eleventh aspect, with reference to the eleventh aspect to the second possible implementation manner of the eleventh aspect, the first message further carries a first terminal identity of the first terminal; and the device further includes an acquiring unit and a determining unit, where the acquiring unit is configured to acquire first authentication information of the first terminal according to the first terminal identity before the sending unit sends the second message to the second ProSe entity, where the first authentication information includes information used for indicating whether the first terminal can perform broadcasting; and the determining unit is configured to determine, according to the first authentication information, that the first terminal can perform broadcasting.

In a fourth possible implementation manner of the eleventh aspect, with reference to the third possible implementation manner of the eleventh aspect, the second message further carries the first terminal identity, so that the second ProSe entity determines, according to the first terminal identity, whether the first terminal can perform broadcasting in the VPLMN; and that the receiving unit receives the third message sent by the second ProSe entity includes: receiving the third message that is sent by the second ProSe entity in a case in which it is determined that the first terminal can perform broadcasting in the VPLMN.

In a fifth possible implementation manner of the eleventh aspect, with reference to the eleventh aspect to the fourth possible implementation manner of the eleventh aspect, the acquiring unit is further configured to acquire roaming indication information before the generating unit generates the second identity according to the first identity, where the roaming indication information is used for indicating whether the first terminal is in a roaming state; and the determining unit is configured to: if the roaming indication information indicates that the first terminal is in the roaming state, determine, according to second indication information, that the first terminal supports broadcasting of the second identity, where the second indication information is used for indicating whether the first terminal can support broadcasting of the second identity.

According to a twelfth aspect, a device for implementing functions of a second proximity service ProSe entity is provided, where the second ProSe entity is a ProSe entity in a visited public land mobile network VPLMN of a first terminal, and the device includes a receiving unit, an allocating unit, and a sending unit, where: the receiving unit is configured to receive a second message sent by a first ProSe entity, where the second message carries a ProSe application identity APP ID, and the first ProSe entity is a ProSe entity in a home public land mobile network HPLMN of the first terminal; the allocating unit is configured to allocate a corresponding codeword or mask to the ProSe APP ID, where the codeword or mask of the ProSe APP ID includes a public land mobile network identity PLMN ID of the VPLMN; and the sending unit is configured to send a third message to the first ProSe entity, where the third message carries a first identity, and the first identity is the codeword or mask allocated to the ProSe APP ID by the second ProSe entity.

In a first possible implementation manner of the twelfth aspect, with reference to the twelfth aspect, the receiving unit is further configured to receive a fifth message sent by a second terminal after the second terminal acquires a second identity that is generated by the first ProSe entity according to the first identity, where the fifth message carries the second identity, and the second identity includes the first identity and a PLMN ID of the HPLMN of the first terminal; the sending unit is further configured to send a seventh message to the first ProSe entity according to the PLMN ID of the HPLMN included in the second identity, where the seventh message carries the second identity; the receiving unit is further configured to receive an eighth message that is sent by the first ProSe entity after the first ProSe entity determines the ProSe APP ID according to the second identity, where the eighth message carries the ProSe APP ID; and the sending unit is further configured to send a sixth message to the second terminal, where the sixth message carries the ProSe APP ID.

In a second possible implementation manner of the twelfth aspect, with reference to the twelfth aspect, the ProSe APP ID includes: a PLMN ID of the HPLMN of the first terminal; and the device further includes a storage unit and a determining unit, where the storage unit is configured to store a correspondence between the PLMN ID of the HPLMN of the first terminal and the codeword of the ProSe APP ID after the allocating unit allocates the corresponding codeword to the ProSe APP ID; the receiving unit is further configured to receive a fifth message sent by a second terminal after the second terminal acquires a third identity, where the fifth message carries the third identity, and the third identity is the codeword allocated to the ProSe application identity APP ID by the second ProSe entity; the determining unit is configured to determine, according to the correspondence, the PLMN ID that is of the HPLMN and that is corresponding to the third identity; the sending unit is configured to send a seventh message to the first ProSe entity according to the PLMN ID that is of the HPLMN and that is corresponding to the third identity, where the seventh message carries the third identity; the receiving unit is configured to receive an eighth message that is sent by the first ProSe entity after the first ProSe entity determines the ProSe APP ID according to the third identity, where the eighth message carries the ProSe APP ID; and the sending unit is configured to send a sixth message to the second terminal, where the sixth message carries the ProSe APP ID.

According to a thirteenth aspect, a device for implementing functions of a first proximity service ProSe entity is provided, where the first ProSe entity is a ProSe entity in a home public land mobile network HPLMN of a first terminal, and the device includes a receiving unit and a sending unit, where the receiving unit is configured to receive a first message sent by the first terminal, where the first message carries a ProSe application identity APP ID; the sending unit is configured to send a second message to a second ProSe entity, where the second message carries the ProSe APP ID, and the second ProSe entity is a ProSe entity in a visited public land mobile network VPLMN of the first terminal; the receiving unit is further configured to receive a third message sent by the second ProSe entity, where the third message carries a third identity, the third identity is a codeword allocated to the ProSe APP ID by the second ProSe entity, and the third identity includes a public land mobile network identity PLMN ID of the VPLMN; and the sending unit is further configured to send a fourth message to the first terminal, where the fourth message carries the third identity.

According to a fourteenth aspect, a first terminal is provided, where the first terminal includes a sending unit, a receiving unit, and a broadcasting unit, where: the sending unit is configured to send a first message to a first proximity service ProSe entity, where the first message carries a preconfigured ProSe application identity APP ID, and the first ProSe entity is a ProSe entity in a home public land mobile network HPLMN of the first terminal; the receiving unit is configured to receive a fourth message sent by the first ProSe entity, where the fourth message carries a second identity, the second identity includes a first identity and a public land mobile network identity PLMN ID of the HPLMN, the first identity is a codeword or mask allocated to the ProSe APP ID by a second ProSe entity, the first identity includes a PLMN ID of a visited public land mobile network VPLMN of the first terminal, and the second ProSe entity is a ProSe entity in the VPLMN; and the broadcasting unit is configured to broadcast the second identity.

In a first possible implementation manner of the fourteenth aspect, with reference to the fourteenth aspect, the first message further carries first indication information, where the first indication information is used for representing whether the first terminal supports broadcasting of the second identity.

According to a fifteenth aspect, a second terminal is provided, where the second terminal includes an acquiring unit, a sending unit, and a receiving unit, where: the acquiring unit is configured to acquire a second identity, where the second identity includes a first identity and a public land mobile network identity PLMN ID of a home public land mobile network HPLMN of a first terminal, the first identity is a codeword or mask allocated to a ProSe application identity APP ID by a second proximity service ProSe entity, the first identity includes a PLMN ID of a visited public land mobile network VPLMN of the first terminal, and the second ProSe entity is a ProSe entity in the VPLMN; the sending unit is configured to send a fifth message to the second ProSe entity according to the PLMN ID of the VPLMN included in the second identity, where the fifth message carries the second identity; and the receiving unit is configured to receive a sixth message sent by the second ProSe entity, where the sixth message carries the ProSe APP ID, the ProSe APP ID is determined by the first ProSe entity according to the second identity carried in a seventh message that is sent by the second ProSe entity to the first ProSe entity according to the PLMN ID of the HPLMN of the first terminal included in the second identity, and the first ProSe entity is a ProSe entity in the HPLMN of the first terminal.

Based on the ProSe information transmission method, the terminal, and the communications device that are provided in the foregoing embodiments of the present disclosure, in the embodiments of the present disclosure, a first identity is a codeword or mask allocated to a ProSe APP ID by a second ProSe entity, and the first identity includes a PLMN ID of a VPLMN. In this way, when terminal first terminal roams to the VPLMN and registers with a network that can be listened on by a second terminal, to perform service broadcasting, because the PLMN ID of the VPLMN of the first terminal is the same as a PLMN ID of the network that can be listened on by the second terminal, in a process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal, that is, the first terminal is not ignored. In addition, after obtaining, through listening, a second identity broadcast by the first terminal, the second terminal may acquire corresponding ProSe application information, for example, information such as an address, a phone number, and/or a discount, according to the second identity, and therefore the second terminal discovers the first terminal. Alternatively, after obtaining, through listening, a third identity broadcast by the first terminal, the second terminal may acquire a corresponding ProSe APP ID from a first ProSe entity of the first terminal according to the third identity by using a correspondence, stored in the second ProSe entity, between a PLMN ID of an HPLMN of the first terminal and the codeword of the ProSe APP ID, thereby obtaining required ProSe application information, for example, information such as an address, a phone number, and a discount. In this way, the second terminal discovers the first terminal.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
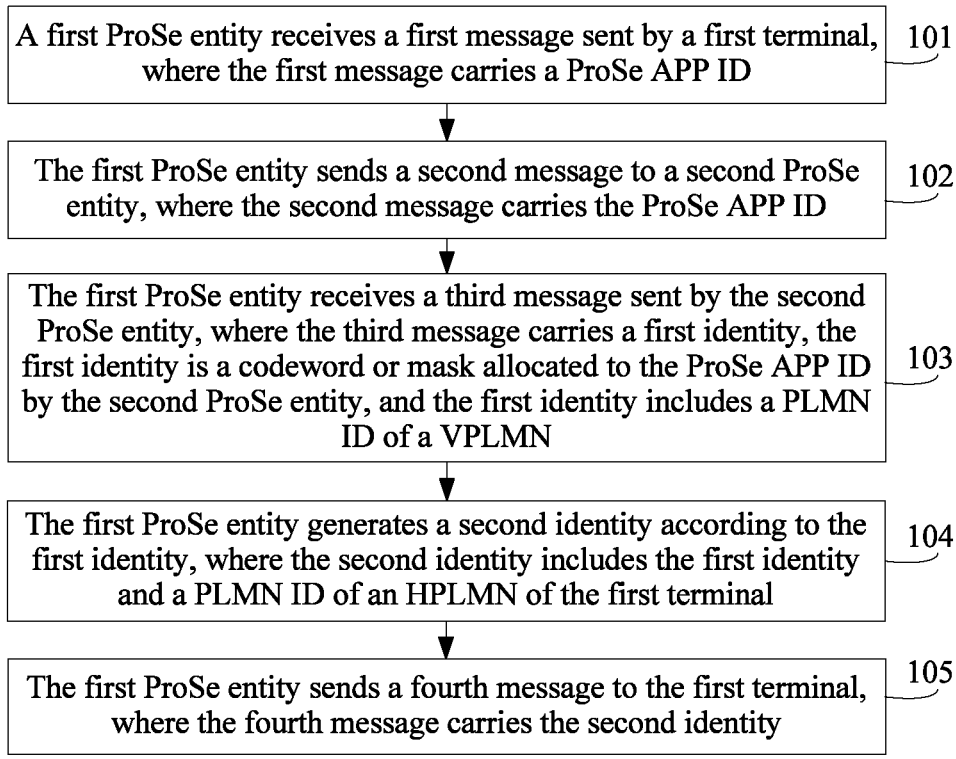
FIG. 1 is a schematic flowchart 1 of a ProSe information transmission method according to an embodiment of the present disclosure.

To make description of the following embodiments clear and concise, several concepts are briefly described first:

1. ProSe APP ID

The ProSe APP ID is in a hierarchical structure, where a lower level is a subclass of an upper level, and a specific form may be expressed as follows:

PLMN ID. APP ID. First level. Second level . . . Nth level

It should be noted that, the PLMN ID is generally specified as a mobile country code (MCC) and a mobile network code (MNC). Certainly, the PLMN ID may also be in another representation form, which is not specifically limited in the embodiments of the present disclosure.

Exemplarily, a specific example of the ProSe APP ID may be as follows:

Example 1 mcc460. mnc00. APP ID. Catering. Domestic. Fast Food. A. B, where mcc460.mnc00 is the PLMN ID included in the ProSe APP ID, mcc460 indicates that the MCC is 460, and mnc00 indicates that the MNC is 00, where 460 represents China, and 00 represents a mobile operator; APP ID is an identity, of software used by a terminal, in an operating system; A represents a name of a specific fast food restaurant; and B represents a region in which A is located.

Certainly, a specific example of the ProSe APP ID may also be as follows:

Example 2 mcc460. mnc00. APP ID. Catering. Domestic. Fast Food

The embodiments of the present disclosure set no specific limitation thereto.

2. Codeword of the ProSe APP ID

The codeword of the ProSe APP ID is also in a hierarchical structure, where levels of the codeword are respectively corresponding to different levels of the ProSe APP ID, and only that a character is converted into a digit that can be broadcast over an air interface. Exemplarily, a codeword corresponding to the ProSe APP ID in the foregoing example 1 may be expressed as follows:

| 46000 | 1010 | 0101 | 1100 | 0111101 | 1101010 | where 46000 is a PLMN ID included in the codeword of the ProSe APP ID and is a combination of the MCC and the MNC, 1010 is a codeword corresponding to the first level "Catering", 0101 is a codeword corresponding to the second level "Domestic", 1100 is a codeword corresponding to the third level "Fast Food", 0111101 is a codeword corresponding to the fourth level "A", and 1101010 is a codeword corresponding to the fifth level "B".

It should be noted that, the codeword of the ProSe APP ID may be simply referred to as a ProSe application codeword (APP code), which is not specifically limited in the embodiments of the present disclosure.

3. Mask of the ProSe APP ID

The mask of the ProSe APP ID is also in a hierarchical structure, where levels of the mask are respectively corresponding to different levels of the ProSe APP ID, and the mask represents only a part of the ProSe APP ID and is used for filtering in a listening process. Exemplarily, a mask corresponding to the ProSe APP ID in the foregoing example 1 may be represented as follows:

| 46000 | 1010 | 0101 | 1100 |

Similarly, for a meaning of each field in the expression of the mask of the ProSe APP ID in the foregoing example, reference may be made to a meaning of a same field in the codeword of the ProSe APP ID, and details are not described herein again.

It should be noted that, the mask of the ProSe APP ID may be simply referred to as a ProSe application mask, which is not specifically limited in the embodiments of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

To facilitate clear description of the technical solutions in the embodiments of the present disclosure, words such as "first", "second", "third", and "fourth" are used in the embodiments of the present disclosure to distinguish between same items or similar items that provide basically the same functions or purposes. A person skilled in the art may understand that the words such as "first", "second", "third", and "fourth" do not restrict a quantity and an implementation order.

In addition, to make description of the following embodiments concise, several related definitions are provided below:

ProSe information: the ProSe information is ProSe information required in a process of implementing ProSe discovery, and may be a ProSe APP ID, or may be a codeword or mask of the ProSe APP ID, which is not specifically limited in the embodiments of the present disclosure.

First ProSe entity: is a ProSe entity in an HPLMN of a first terminal, where the ProSe entity is a logical function used in a ProSe. The ProSe entity is a function in a network, and may be an individual entity, or may be borne on another core network device, such as a mobility management entity (MME) or a PGW. The ProSe entity includes a direct discovery name management function that is used to allocate a mapping relationship between a ProSe APP ID and a ProSe APP Code in a ProSe discovery process.

Second ProSe entity: is a ProSe entity in a visited public land mobile network (VPLMN) of the first terminal.

Exemplarily, it is assumed that a first terminal of an American telecom operator (e.g., American Telephone &

Telegraph (ATT)) roams to China and registers with a network of China Mobile; then, a ProSe entity of ATT is a first ProSe entity, and a ProSe entity of China Mobile is a second ProSe entity.

It should be noted that, the foregoing definitions are applicable to the following embodiments of the present disclosure, and unified description is made herein and is not repeated below. The first terminal has a broadcasting function, and the second terminal has a listening function. The embodiments of the present disclosure set no specific limitation on the first terminal and the second terminal.

Embodiment 1

This embodiment of the present disclosure provides a ProSe information transmission method. Specifically, as shown in FIG. 1, the method includes:

101. A first ProSe entity receives a first message sent by a first terminal, where the first message carries a ProSe APP ID.

Specifically, the first message may be a discovery request message, which is not specifically limited in this embodiment of the present disclosure. The first message carries the ProSe APP ID, where the ProSe APP ID is a ProSe APP ID configured by a first terminal side.

Exemplarily, if a user of an American operator ATT wants to perform service broadcasting in a region A in China to broadcast a restaurant B, the user may select (L1) Catering. (L2) Abroad. (L3) Fast Food. (L4) A. (L5) B on a first terminal, and then the first terminal may configure a ProSe APP ID according to user input information as follows: mcc310. mnc070. APP ID. Catering. Abroad. Fast Food. A. B, where mcc 310 represents America, mnc070 represents ATT, APP ID is an identity, of software used by the first terminal, in an operating system, A represents a name of a specific fast food restaurant, and B represents a region in which A is located.

It should be noted that, the first message may further carry information such as a first terminal identity of the first terminal and an APP ID, which is not specifically limited in this embodiment of the present disclosure.

102. The first ProSe entity sends a second message to a second ProSe entity, where the second message carries the ProSe APP ID.

Specifically, in this embodiment of the present disclosure, after receiving the first message sent by the first terminal, the first ProSe entity sends the second message to the second ProSe entity.

It should be noted that, the second message may further carry information such as the first terminal identity of the first terminal, which is not specifically limited in this embodiment of the present disclosure.

103. The first ProSe entity receives a third message sent by the second ProSe entity, where the third message carries a first identity, the first identity is a codeword or mask allocated to the ProSe APP ID by the second ProSe entity, and the first identity includes a PLMN ID of a VPLMN.

Specifically, in some approaches, when the first terminal roams to the VPLMN and registers with a network that can be listened on by a second terminal, to perform broadcasting, a codeword or mask of the ProSe APP ID is still allocated by the first ProSe entity, and the codeword or mask of the ProSe APP ID includes a PLMN ID of an HPLMN of the first terminal. In a process of listening to the codeword of the ProSe APP ID by the second terminal, a codeword or mask that is of the ProSe APP ID and that is obtained through listening by the second terminal is obtained from the network that can be listened on by the second terminal, and carries PLMN ID information of the network that can be listened on by the second terminal. The PLMN ID of the HPLMN of the first terminal may be different from a PLMN ID of the network that can be listened on by the second terminal. Therefore, when the first terminal performs service broadcasting, in the process of listening to the codeword of the ProSe APP ID by the second terminal in the network that can be listened on by the second terminal, the PLMN ID of the HPLMN of the first terminal cannot match the PLMN ID of the network that can be listened on by the second terminal, and consequently the second terminal cannot obtain, through listening, the codeword that is of the ProSe APP ID and that is broadcast by the first terminal. Therefore, the first terminal is ignored.

In this embodiment of the present disclosure, the codeword or mask of the ProSe APP ID is allocated by the second ProSe entity, and the codeword or mask of the ProSe APP ID includes the PLMN ID of the VPLMN. In this way, when the first terminal roams to the VPLMN and registers with the network that can be listened on by the second terminal, to perform service broadcasting, because the PLMN ID of the VPLMN of the first terminal is the same as the PLMN ID of the network that can be listened on by the second terminal, in the process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal, that is, the first terminal is not ignored.

104. The first ProSe entity generates a second identity according to the first identity, where the second identity includes the first identity and a PLMN ID of an HPLMN of the first terminal.

Specifically, in this embodiment of the present disclosure, after acquiring the first identity, the first ProSe entity generates the second identity according to the first identity, where if the first identity is the codeword of the ProSe APP ID, the generating a second identity according to the first identity may include: generating the second identity according to the codeword of the ProSe APP ID, where the second identity includes the codeword of the ProSe APP ID and the PLMN ID of the HPLMN; or if the first identity is the mask of the ProSe APP ID, the generating a second identity according to the first identity may include: allocating a codeword corresponding to the ProSe App. ID to the mask of the ProSe APP ID; and generating the second identity according to the codeword of the ProSe APP ID, where the second identity includes the codeword of the ProSe APP ID and the PLMN ID of the HPLMN.

As described above, a process of generating the second identity according to the first identity is equivalent to a process of extending the codeword or mask of the ProSe APP ID. By means of adding the PLMN ID of the HPLMN of the first terminal to the first identity, after obtaining, through listening, the second identity broadcast by the first terminal, the second terminal may acquire a corresponding ProSe APP ID from the first ProSe entity of the first terminal according to the second identity, thereby obtaining required ProSe application information, for example, information such as an address, a phone number, and/or a discount. In this way, the second terminal discovers the first terminal.

105. The first ProSe entity sends a fourth message to the first terminal, where the fourth message carries the second identity.

Specifically, in this embodiment of the present disclosure, the fourth message carries the second identity. In this way, after receiving the first message, the first terminal may broadcast the second identity.

Based on the foregoing ProSe information transmission method provided in this embodiment of the present disclosure, further, as described above, the first message may further carry the first terminal identity, and before the first ProSe entity sends the second message to the second ProSe entity, the method may further include: acquiring, by the first ProSe entity, first authentication information of the first terminal according to the first terminal identity, where the first authentication information includes information used for indicating whether the first terminal can perform broadcasting; and determining, according to the first authentication information, that the first terminal can perform broadcasting.

That is, before the second message is sent to the second ProSe entity, broadcasting authentication is first performed on the first terminal; for example, it is determined whether the first terminal is in arrears, or whether the first terminal is an authorized terminal. The second message is sent to the second ProSe entity only on a premise that the broadcasting authentication performed on the first terminal succeeds; in this way, network security can be ensured.

Further, as described above, the second message may further carry the first terminal identity, so that the second ProSe entity determines, according to the first terminal identity, whether the first terminal can perform broadcasting in the VPLMN of the first terminal.

The receiving a third message sent by the second ProSe entity may specifically include: receiving the third message that is sent by the second ProSe entity in a case in which it is determined that the first terminal can perform broadcasting in the VPLMN.

That is, the second ProSe entity sends the third message to the first ProSe entity only on a premise that broadcasting authentication performed on the first terminal by the second ProSe entity succeeds, so that network security and standardization can be further ensured.

For example, after a first terminal of ATT roams to China and registers with a network of China Mobile, the first terminal can perform a broadcasting service only in a case in which the network of China Mobile allows the first terminal to perform broadcasting; otherwise, the first terminal cannot perform a broadcasting service.

Further, in the ProSe information transmission method provided in this embodiment of the present disclosure, before the generating a second identity according to the first identity, the method may further include: acquiring roaming indication information, where the roaming indication information is used for indicating whether the first terminal is in a roaming state; and if the roaming indication information indicates that the first terminal is in the roaming state, determining, according to second indication information, that the first terminal supports broadcasting of the second identity, where the second indication information is used for indicating whether the first terminal can support broadcasting of the second identity.

The foregoing first authentication information may include roaming indication information, and the acquiring roaming indication information may be specifically acquiring the roaming indication information included in the first authentication information, which is not specifically limited in this embodiment of the present disclosure.

Certainly, the roaming indication information may also be acquired after the first ProSe entity receives the third message sent by the second ProSe entity, which is not specifically limited in this embodiment of the present disclosure.

Specifically, if the second indication information indicates that the first terminal supports broadcasting of the second identity, it indicates that the first terminal supports an extended codeword or mask of the ProSe APP ID, that is, the first terminal supports the second identity. In this way, the second message is sent to the second ProSe entity after it is determined, according to the second indication information, that the first terminal supports broadcasting of the second identity, so that validity and accuracy of a subsequent terminal discovery process can be ensured.

Based on the foregoing ProSe information transmission method provided in this embodiment of the present disclosure, a first ProSe entity may receive a third message sent by the second ProSe entity, where the third message carries a first identity, the first identity is a codeword or mask allocated to the ProSe APP ID by the second ProSe entity, and the first identity includes a PLMN ID of the VPLMN. In this way, when the first terminal roams to the VPLMN and registers with a network that can be listened on by a second terminal, to perform service broadcasting, because the PLMN ID of the VPLMN broadcast by the first terminal is the same as a PLMN ID of the network that can be listened on by the second terminal, in a process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal. In addition, the first ProSe entity may further generate a second identity according to the first identity, where the second identity includes the first identity and a PLMN ID of an HPLMN of the first terminal. In this way, after obtaining, through listening, the second identity broadcast by the first terminal, the second terminal may acquire corresponding ProSe application information, for example, information such as an address, a phone number, and/or a discount, according to the second identity. In this way, the second terminal discovers the first terminal.

Figure 2:
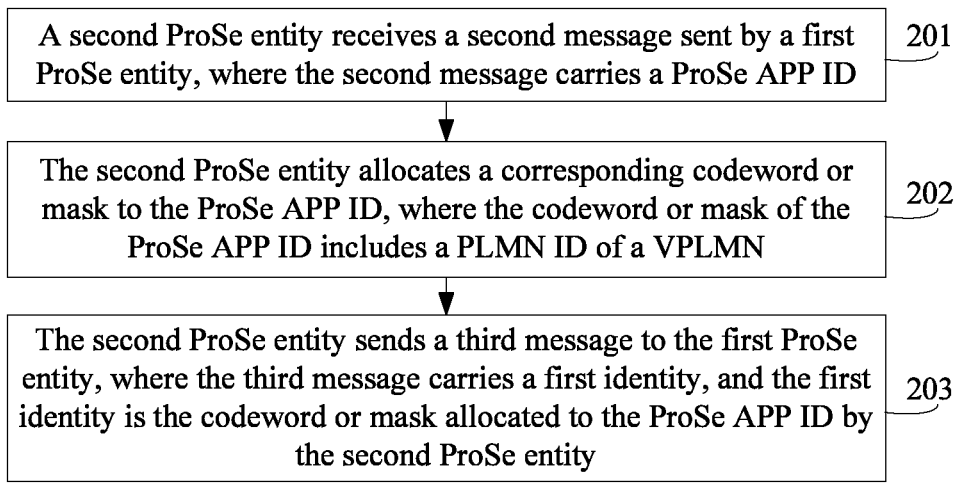
FIG. 2 is a schematic flowchart 2 of a ProSe information transmission method according to an embodiment of the present disclosure.

This embodiment of the present disclosure further provides a ProSe information transmission method. Specifically, as shown in FIG. 2, the method includes:

201. A second ProSe entity receives a second message sent by a first ProSe entity, where the second message carries a ProSe APP ID.

Specifically, in some approaches, when a first terminal roams to a VPLMN and registers with a network that can be listened on by a second terminal, to perform broadcasting, the first ProSe entity allocates a corresponding codeword or mask to the ProSe APP ID, and then the second ProSe entity receives a message that carries the codeword or mask of the ProSe APP ID and that is sent by the first ProSe entity. In this embodiment of the present disclosure, the second ProSe entity receives the second message that carries the ProSe APP ID and that is sent by the first ProSe entity, and the first ProSe entity does not allocate a corresponding codeword or mask to the ProSe APP ID.

It should be noted that, the second message may further carry information such as a first terminal identity of the first terminal, which is not specifically limited in this embodiment of the present disclosure.

202. The second ProSe entity allocates a corresponding codeword or mask to the ProSe APP ID, where the codeword or mask of the ProSe APP ID includes a PLMN ID of a VPLMN.

Specifically, as described above, in some approaches, when the first terminal roams to the VPLMN and registers with the network that can be listened on by the second terminal, to perform broadcasting, the codeword or mask of the ProSe APP ID is still allocated by the first ProSe entity, where the codeword or mask of the ProSe APP ID includes a PLMN ID of an HPLMN of the first terminal. In a process of listening to the codeword of the ProSe APP ID by the second terminal, a codeword or mask that is of the ProSe APP ID and that is obtained through listening by the second terminal is obtained from the network that can be listened on by the second terminal, and carries PLMN ID information of the network that can be listened on by the second terminal. The PLMN ID of the HPLMN of the first terminal may be different from a PLMN ID of the network that can be listened on by the second terminal. Therefore, when the first terminal performs service broadcasting, in the process of listening to the codeword of the ProSe APP ID by the second terminal in the network that can be listened on by the second terminal, the PLMN ID of the HPLMN of the first terminal cannot match the PLMN ID of the network that can be listened on by the second terminal, and consequently the second terminal cannot obtain, through listening, the codeword that is of the ProSe APP ID and that is broadcast by the first terminal. Therefore, the first terminal is ignored.

In this embodiment of the present disclosure, the codeword or mask of the ProSe APP ID is allocated by the second ProSe entity, and the codeword or mask of the ProSe APP ID includes the PLMN ID of the VPLMN. In this way, when the first terminal roams to the VPLMN and registers with the network that can be listened on by the second terminal, to perform service broadcasting, because the PLMN ID of the VPLMN of the first terminal is the same as the PLMN ID of the network that can be listened on by the second terminal, in the process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal, that is, the first terminal is not ignored.

203. The second ProSe entity sends a third message to the first ProSe entity, where the third message carries a first identity, and the first identity is the codeword or mask allocated to the ProSe APP ID by the second ProSe entity.

It should be noted that, if the second message carries the first terminal identity, the second ProSe entity may further perform broadcasting authentication on the first terminal according to information about the first terminal identity, so as to determine whether the first terminal can perform broadcasting in the VPLMN, which is not specifically limited in this embodiment of the present disclosure.

Based on the foregoing ProSe information transmission method provided in this embodiment of the present disclosure, after acquiring the ProSe APP ID, the second ProSe entity allocates the corresponding codeword or mask to the ProSe APP ID, where the codeword or mask of the ProSe APP ID includes the PLMN ID of the VPLMN. In this way, when the first terminal roams to the VPLMN and registers with the network that can be listened on by the second terminal, to perform service broadcasting, because the PLMN ID of the VPLMN of the first terminal is the same as the PLMN ID of the network that can be listened on by the second terminal, in the process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal, that is, the first terminal is not ignored.

Figure 3:
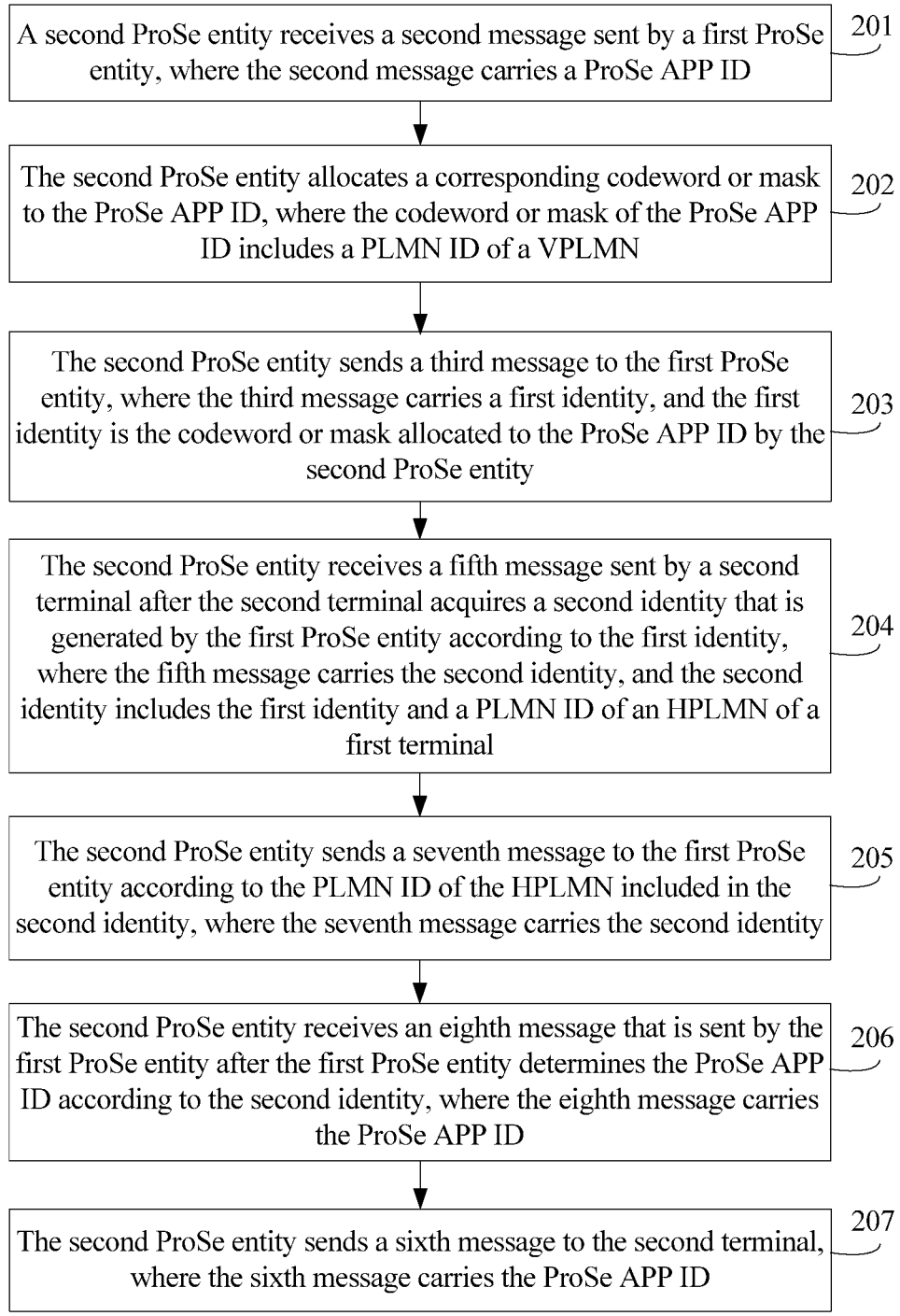
FIG. 3 is a schematic flowchart 3 of a ProSe information transmission method according to an embodiment of the present disclosure.

Based on the ProSe information transmission method shown in FIG. 2, further, as shown in FIG. 3, the method may further include:

204. The second ProSe entity receives a fifth message sent by a second terminal after the second terminal acquires a second identity that is generated by the first ProSe entity according to the first identity, where the fifth message carries the second identity, and the second identity includes the first identity and a PLMN ID of an HPLMN of a first terminal.

Specifically, in this embodiment of the present disclosure, the second identity includes the first identity, where the first identity is the codeword or mask allocated to the ProSe APP ID by the second ProSe entity, and the first identity includes the PLMN ID of the VPLMN of the first terminal. In this way, when the first terminal roams to the VPLMN and registers with the network that can be listened on by the second terminal, to perform service broadcasting, because the PLMN ID of the VPLMN of the first terminal is the same as the PLMN ID of the network that can be listened on by the second terminal, in the process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal, that is, the second terminal acquires the second identity.

After acquiring the second identity, the second terminal may send the fifth message to the second ProSe entity according to the PLMN ID of the VPLMN included in the second identity, and then the second ProSe entity may receive the fifth message sent by the second terminal.

205. The second ProSe entity sends a seventh message to the first ProSe entity according to the PLMN ID of the HPLMN included in the second identity, where the seventh message carries the second identity.

Specifically, because the second identity includes the PLMN ID of the HPLMN of the first terminal, after receiving the fifth message sent by the second terminal, the second ProSe entity may determine a ProSe entity, that is, the first ProSe entity, in the HPLMN of the first terminal according to the PLMN ID of the HPLMN of the first terminal, and then may send the seventh message to the first ProSe entity.

206. The second ProSe entity receives an eighth message that is sent by the first ProSe entity after the first ProSe entity determines the ProSe APP ID according to the second identity, where the eighth message carries the ProSe APP ID.

Specifically, in this embodiment of the present disclosure, the ProSe APP ID is determined by the first ProSe entity according to the second identity. After determining the ProSe APP ID according to the second identity, the first ProSe entity may send the eighth message to the second ProSe entity, and then the second ProSe entity may receive the eighth message, where the eighth message carries the ProSe APP ID.

207. The second ProSe entity sends a sixth message to the second terminal, where the sixth message carries the ProSe APP ID.

Specifically, after receiving the eighth message, the second ProSe entity further sends the sixth message to the second terminal, where the sixth message carries the ProSe APP ID. Therefore, the second terminal may obtain required ProSe application information, for example, information such as an address, a phone number, and a discount, according to the ProSe APP ID, thereby completing a process of discovering the first terminal by the second terminal.

Based on the ProSe information transmission method shown in FIG. 2, optionally, the ProSe APP ID includes: the PLMN ID of the HPLMN of the first terminal.

Figure 4:
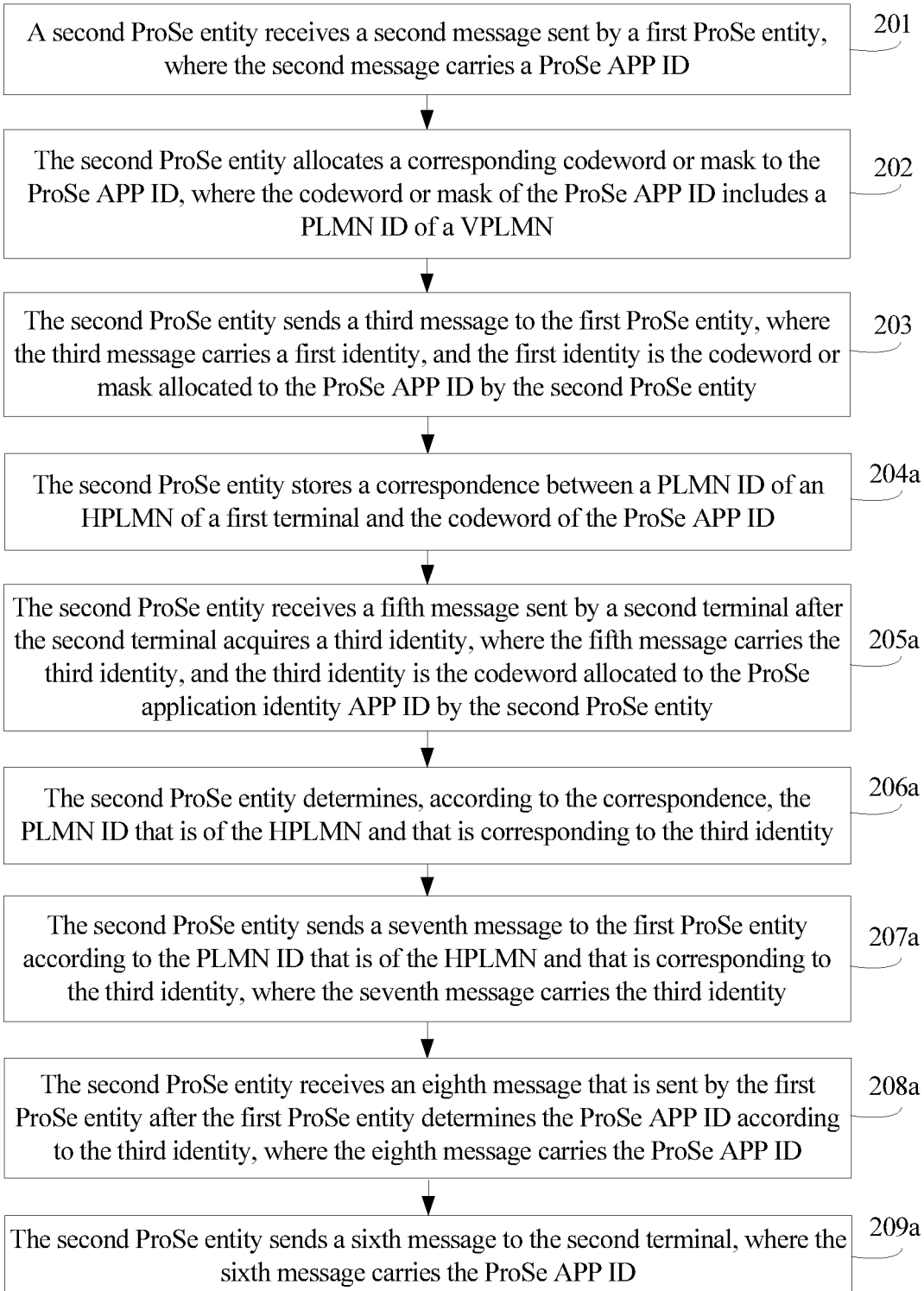
FIG. 4 is a schematic flowchart 4 of a ProSe information transmission method according to an embodiment of the present disclosure.

As shown in FIG. 4, after the second ProSe entity allocates the corresponding codeword to the ProSe APP ID, the method may further include:

204a. The second ProSe entity stores a correspondence between the PLMN ID of the HPLMN of the first terminal and the codeword of the ProSe APP ID.

It should be noted that, there is no specific execution order between step 203 and step 204a; step 203 may be performed before step 204a, or step 204a may be performed before step 203, which is not specifically limited in this embodiment of the present disclosure.

205a. The second ProSe entity receives a fifth message sent by a second terminal after the second terminal acquires a third identity, where the fifth message carries the third identity, and the third identity is the codeword allocated to the ProSe application identity APP ID by the second ProSe entity.

Specifically, in this embodiment of the present disclosure, the third identity is the codeword allocated to the ProSe APP ID by the second ProSe entity, and the third identity includes the PLMN ID of the VPLMN of the first terminal. Therefore, when the first terminal performs service broadcasting, in a process of listening to the codeword of the ProSe APP ID by the second terminal in the network that can be listened on by the second terminal, the PLMN ID of the HPLMN of the first terminal cannot match the PLMN ID of the network that can be listened on by the second terminal, and consequently the second terminal cannot obtain, through listening, the codeword that is of the ProSe APP ID and that is broadcast by the first terminal, and then acquire the third identity.

After acquiring the third identity, the second terminal may send the fifth message to the second ProSe entity according to the PLMN ID of the VPLMN included in the third identity, and then the second ProSe entity may receive the fifth message sent by the second terminal.

206a. The second ProSe entity determines, according to the correspondence, the PLMN ID that is of the HPLMN and that is corresponding to the third identity.

Specifically, it can be learned from step 204a that, in this embodiment of the present disclosure, the second ProSe entity stores the correspondence between the PLMN ID of the HPLMN of the first terminal and the codeword of the ProSe APP ID. In this way, in a terminal discovery process of the second terminal, after obtaining, through listening, the third identity broadcast by the first terminal, the second terminal may acquire a corresponding ProSe APP ID from the first ProSe entity of the first terminal according to the third identity by using the second ProSe entity with reference to the correspondence, thereby obtaining required ProSe application information, for example, information such as an address, a phone number, and a discount. In this way, the second terminal discovers the first terminal.

207a. The second ProSe entity sends a seventh message to the first ProSe entity according to the PLMN ID that is of the HPLMN and that is corresponding to the third identity, where the seventh message carries the third identity.

Specifically, after determining the PLMN ID that is of the HPLMN and that is corresponding to the third identity, the second ProSe entity may determine a ProSe entity, that is, the first ProSe entity, in the HPLMN according to the PLMN ID of the HPLMN, and then may send the seventh message to the first ProSe entity.

208a. The second ProSe entity receives an eighth message that is sent by the first ProSe entity after the first ProSe entity determines the ProSe APP ID according to the third identity, where the eighth message carries the ProSe APP ID.

Specifically, in this embodiment of the present disclosure, the ProSe APP ID is determined by the first ProSe entity according to the third identity. After determining the ProSe APP ID according to the third identity, the first ProSe entity may send the eighth message to the second ProSe entity, and then the second ProSe entity may receive the eighth message, where the eighth message carries the ProSe APP ID.

209a. The second ProSe entity sends a sixth message to the second terminal, where the sixth message carries the ProSe APP ID.

Specifically, after receiving the eighth message, the second ProSe entity further sends the sixth message to the second terminal, where the sixth message carries the ProSe APP ID. Therefore, the second terminal may obtain the required ProSe application information, for example, information such as an address, a phone number, and a discount, according to the ProSe APP ID.

Figure 5:
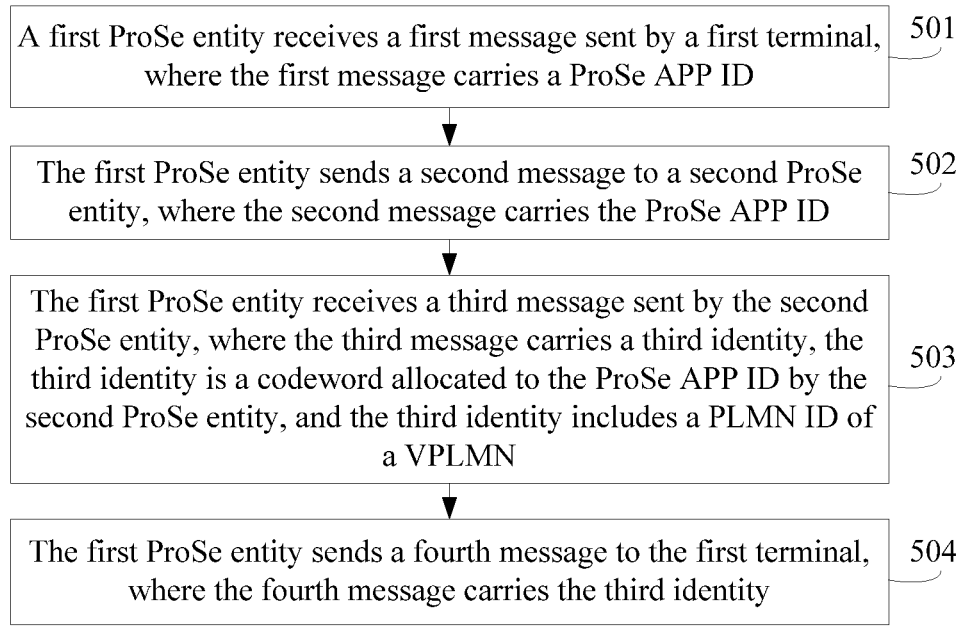
FIG. 5 is a schematic flowchart 5 of a ProSe information transmission method according to an embodiment of the present disclosure.

This embodiment of the present disclosure further provides a ProSe information transmission method. Specifically, as shown in FIG. 5, the method includes:

501. A first ProSe entity receives a first message sent by a first terminal, where the first message carries a ProSe APP ID.

Specifically, the first message may be a discovery request message, which is not specifically limited in this embodiment of the present disclosure.

The first message carries the ProSe APP ID, where the ProSe APP ID is a ProSe APP ID configured by a first terminal side. Specifically, reference may be made to description in the embodiment shown in FIG. 1, and details are not described herein again.

It should be noted that, the first message may further carry information such as a first terminal identity of the first terminal and an APP ID, which is not specifically limited in this embodiment of the present disclosure.

502. The first ProSe entity sends a second message to a second ProSe entity, where the second message carries the ProSe APP ID.

Specifically, in this embodiment of the present disclosure, after receiving the first message sent by the first terminal, the first ProSe entity sends the second message to the second ProSe entity.

It should be noted that, the second message may further carry information such as the first terminal identity of the first terminal, which is not specifically limited in this embodiment of the present disclosure.

503. The first ProSe entity receives a third message sent by the second ProSe entity, where the third message carries a third identity, the third identity is a codeword allocated to the ProSe APP ID by the second ProSe entity, and the third identity includes a PLMN ID of a VPLMN.

Specifically, in this embodiment of the present disclosure, the second ProSe entity allocates a corresponding codeword to the ProSe APP ID, and the codeword of the ProSe APP ID includes the PLMN ID of the VPLMN. In this way, when the first terminal roams to the VPLMN and registers with a network that can be listened on by a second terminal, to perform service broadcasting, because the PLMN ID of the VPLMN of the first terminal is the same as a PLMN ID of the network that can be listened on by the second terminal, in a process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal, that is, the first terminal is not ignored.

504. The first ProSe entity sends a fourth message to the first terminal, where the fourth message carries the third identity.

Specifically, in this embodiment of the present disclosure, after acquiring the third identity, the first ProSe entity sends the fourth message to the first terminal, where the fourth message carries the third identity. In this way, after receiving the first message, the first terminal may broadcast the third identity.

Certainly, the first ProSe entity may further perform broadcasting authentication on the first terminal according to the first terminal identity. Specifically, reference may be made to description in the embodiment shown in FIG. 1, and details are not described herein again.

Based on the foregoing ProSe information transmission method provided in this embodiment of the present disclosure, a first ProSe entity may receive a third message sent by the second ProSe entity, where the third message carries a third identity, the third identity is a codeword allocated to the ProSe APP ID by the second ProSe entity, and the third identity includes a PLMN ID of the VPLMN; then, a fourth message is sent to the first terminal, where the fourth message carries the third identity. In this way, when the first terminal roams to the VPLMN and registers with a network that can be listened on by a second terminal, to perform service broadcasting, because the PLMN ID of the VPLMN broadcast by the first terminal is the same as a PLMN ID of the network that can be listened on by the second terminal, in a process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal, that is, the second terminal acquires the third identity.

Figure 6:
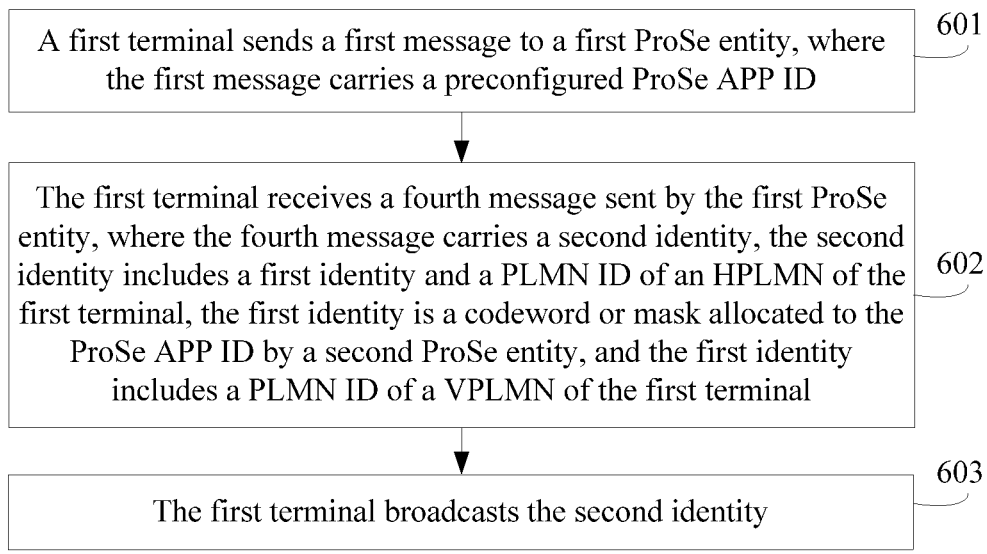
FIG. 6 is a schematic flowchart 6 of a ProSe information transmission method according to an embodiment of the present disclosure.

This embodiment of the present disclosure further provides a ProSe information transmission method. Specifically, as shown in FIG. 6, the method includes:

601. A first terminal sends a first message to a first ProSe entity, where the first message carries a preconfigured ProSe APP ID.

Specifically, for a method for configuring the ProSe APP ID by the first terminal, reference may be made to description in the embodiment shown in FIG. 1, and details are not described herein again.

Specifically, the first message may be a discovery request message, which is not specifically limited in this embodiment of the present disclosure.

The first message may further carry information such as a first terminal identity of the first terminal and an APP ID, which is not specifically limited in this embodiment of the present disclosure.

Certainly, the first message may further carry first indication information, where the first indication information is used for representing whether the first terminal supports broadcasting of a second identity, which is not specifically limited in this embodiment of the present disclosure.

602. The first terminal receives a fourth message sent by the first ProSe entity, where the fourth message carries a second identity, the second identity includes a first identity and a PLMN ID of an HPLMN of the first terminal, the first identity is a codeword or mask allocated to the ProSe APP ID by a second ProSe entity, and the first identity includes a PLMN ID of a VPLMN of the first terminal.

603. The first terminal broadcasts the second identity.

Based on the foregoing ProSe information transmission method provided in this embodiment of the present disclosure, a first terminal may broadcast a second identity, and the second identity includes a first identity and a PLMN ID of an HPLMN of the first terminal, where the first identity is a codeword or mask allocated to the ProSe APP ID by a second ProSe entity, and the first identity includes a PLMN ID of a VPLMN of the first terminal. In this way, when the first terminal roams to the VPLMN and registers with a network that can be listened on by a second terminal, to perform service broadcasting, because the PLMN ID of the VPLMN broadcast by the first terminal is the same as a PLMN ID of the network that can be listened on by the second terminal, in a process of listening to the codeword of the ProSe APP ID by the second terminal in the network that can be listened on by the second terminal, the PLMN ID of the HPLMN of the first terminal can successfully match the PLMN ID of the network that can be listened on by the second terminal. Therefore, the second terminal obtains, through listening, the codeword that is of the ProSe APP ID and that is broadcast by the first terminal. In addition, the second identity further includes the PLMN ID of the HPLMN of the first terminal. Therefore, after obtaining, through listening, the second identity broadcast by the first terminal, the second terminal may acquire corresponding ProSe application information, for example, information such as an address, a phone number, and/or a discount, according to the second identity. In this way, the second terminal discovers the first terminal.

Figure 7:
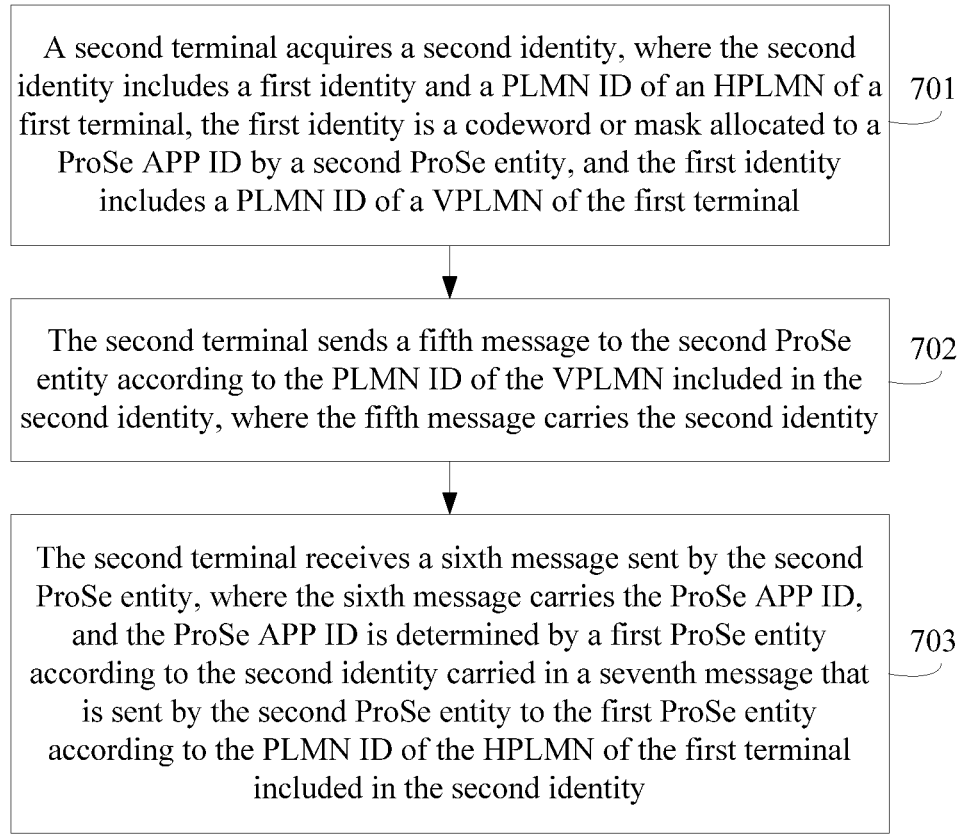
FIG. 7 is a schematic flowchart 7 of a ProSe information transmission method according to an embodiment of the present disclosure.

This embodiment of the present disclosure further provides a ProSe information transmission method, and the method is applied to a second terminal. Specifically, as shown in FIG. 7, the method includes:

701. The second terminal acquires a second identity, where the second identity includes a first identity and a PLMN ID of an HPLMN of a first terminal, the first identity is a codeword or mask allocated to a ProSe APP ID by a second ProSe entity, and the first identity includes a PLMN ID of a VPLMN of the first terminal.

Specifically, in this embodiment of the present disclosure, the second identity includes the first identity, where the first identity is the codeword or mask allocated to the ProSe APP ID by the second ProSe entity, and the first identity includes the PLMN ID of the VPLMN of the first terminal. In this way, when the first terminal roams to the VPLMN and registers with a network that can be listened on by the second terminal, to perform service broadcasting, because the PLMN ID of the VPLMN broadcast by the first terminal is the same as a PLMN ID of the network that can be listened on by the second terminal, in a process of listening to the codeword of the ProSe APP ID by the second terminal in the network that can be listened on by the second terminal, the PLMN ID of the HPLMN of the first terminal can successfully match the PLMN ID of the network that can be listened on by the second terminal. Therefore, the second terminal obtains, through listening, the codeword that is of the ProSe APP ID and that is broadcast by the first terminal, thereby acquiring the second identity.

702. The second terminal sends a fifth message to the second ProSe entity according to the PLMN ID of the VPLMN included in the second identity, where the fifth message carries the second identity.

Specifically, after acquiring the second identity, the second terminal may determine a ProSe entity, that is, the second ProSe entity, in the VPLMN according to the PLMN ID of the VPLMN included in the second identity, and then send a second message to the second ProSe entity, where the fifth message carries the second identity.

It should be noted that, the fifth message may further carry information such as a second terminal identity of the second terminal, which is not specifically limited in this embodiment of the present disclosure.

703. The second terminal receives a sixth message sent by the second ProSe entity, where the sixth message carries the ProSe APP ID, and the ProSe APP ID is determined by the first ProSe entity according to the second identity carried in a seventh message that is sent by the second ProSe entity to the first ProSe entity according to the PLMN ID of the HPLMN of the first terminal included in the second identity.

Specifically, after sending the fifth message to the second ProSe entity, the second terminal further receives the sixth message sent by the second ProSe entity, where the sixth message carries the ProSe APP ID.

As described in step 701, the second identity includes the PLMN ID of the HPLMN of the first terminal. Therefore, after the second terminal sends the fifth message to the second ProSe entity, the second ProSe entity may send the seventh message to the first ProSe entity according to the PLMN ID of the HPLMN of the first terminal. The first ProSe entity determines the ProSe APP ID according to the second identity carried in the seventh message, and then the first ProSe entity may send an eighth message to the second ProSe entity, where the eighth message carries the ProSe APP ID. Then, the second ProSe entity may send the sixth message to the first terminal, where the sixth message carries the ProSe APP ID.

Based on the foregoing ProSe information transmission method provided in this embodiment of the present disclosure, a second terminal may acquire a second identity, and may send a fifth message to the second ProSe entity according to a PLMN ID of the VPLMN included in the second identity; the second ProSe entity sends a seventh message to the first ProSe entity according to a PLMN ID of an HPLMN of the first terminal included in the second identity, and the first ProSe entity determines a ProSe APP ID according to the second identity carried in the seventh message; then, the first terminal may receive a sixth message sent by the second ProSe entity, where the sixth message carries the ProSe APP ID. Therefore, the first terminal may acquire the ProSe APP ID, and then may obtain required ProSe application information, for example, information such as an address, a phone number, and a discount, according to the ProSe APP ID. In this way, the second terminal discovers the first terminal.

Embodiment 2

Figure 8:
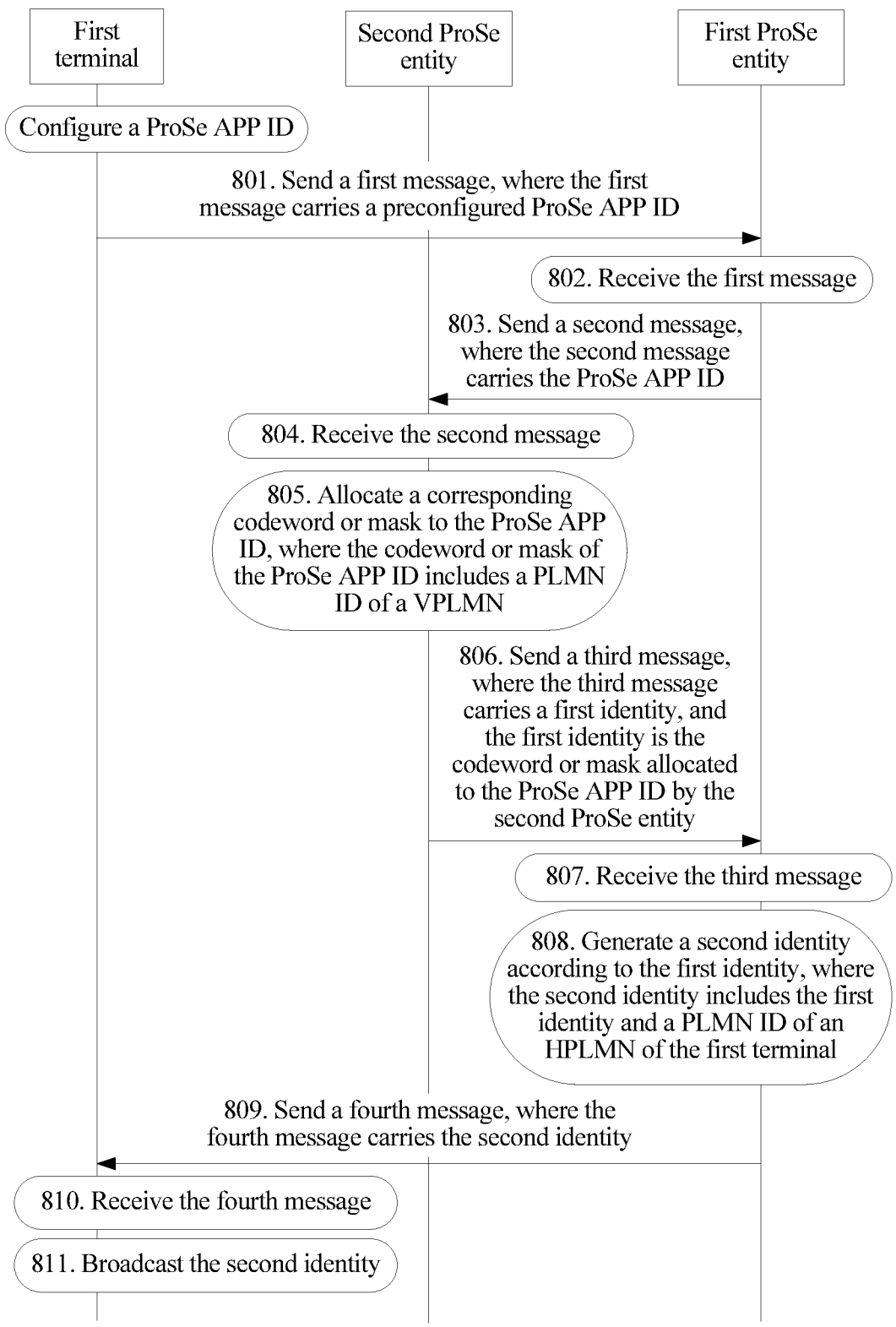
FIG. 8 is a schematic interaction diagram 1 of a ProSe information transmission method according to an embodiment of the present disclosure.

This embodiment of the present disclosure provides a ProSe information transmission method, where interaction between a first terminal, a first ProSe entity, and a second ProSe entity is used as an example for specific description. Specifically, as shown in FIG. 8, the method includes:

801. The first terminal sends a first message to the first ProSe entity, where the first message carries a preconfigured ProSe APP ID.

802. The first ProSe entity receives the first message.

803. The first ProSe entity sends a second message to the second ProSe entity, where the second message carries the ProSe APP ID.

804. The second ProSe entity receives the second message.

805. The second ProSe entity allocates a corresponding codeword or mask to the ProSe APP ID, where the codeword or mask of the ProSe APP ID includes a PLMN ID of a VPLMN.

806. The second ProSe entity sends a third message to the first ProSe entity, where the third message carries a first identity, and the first identity is the codeword or mask allocated to the ProSe APP ID by the second ProSe entity.

807. The first ProSe entity receives the third message.

808. The first ProSe entity generates a second identity according to the first identity, where the second identity includes the first identity and a PLMN ID of an HPLMN of the first terminal.

809. The first ProSe entity sends a fourth message to the first terminal, where the fourth message carries the second identity.

810. The first terminal receives the fourth message.

811. The first terminal broadcasts the second identity.

Specifically, for description of steps 801 to 811, reference may be made to related description in Embodiment 1, and details are not described again in this embodiment of the present disclosure.

It should be noted that, a process of performing broadcasting authentication on the first terminal by the first ProSe entity and/or a process of determining whether the first terminal can support broadcasting of the second identity may further exist between step 802 and step 803. For details, reference may be made to description in Embodiment 1, and details are not described again in this embodiment of the present disclosure.

In addition, a process of performing broadcasting authentication on the first terminal by the second ProSe entity may also exist between step 804 and step 805. For details, reference may be made to description in Embodiment 1, and details are not described again in this embodiment of the present disclosure.

Figure 10:
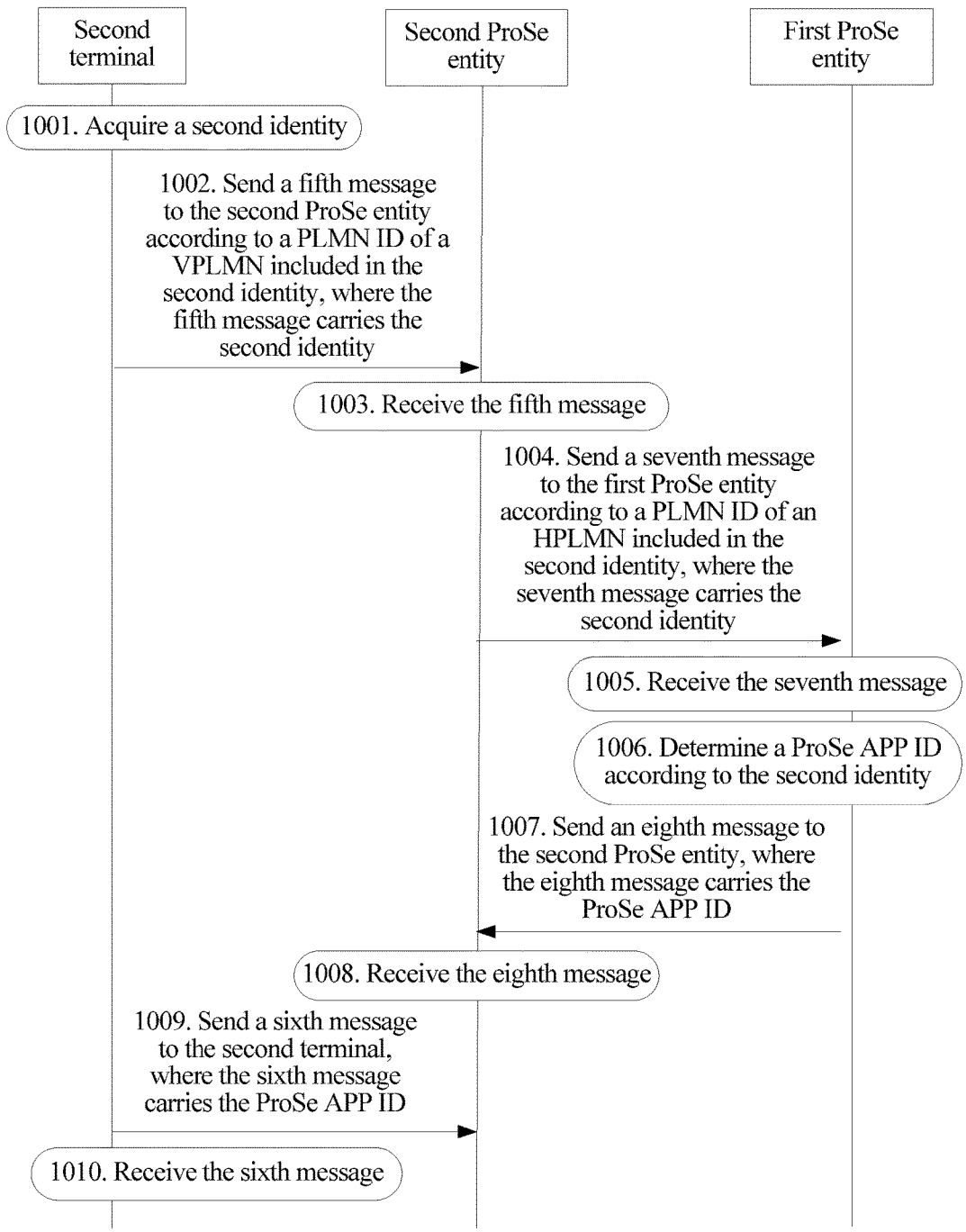
FIG. 10 is a schematic interaction diagram 3 of a ProSe information transmission method according to an embodiment of the present disclosure.

Further, this embodiment of the present disclosure further provides a ProSe information transmission method, where interaction between a second terminal, a first ProSe entity, and a second ProSe entity is used as an example for specific description. Specifically, as shown in FIG. 10, the method includes:

1001. The second terminal acquires a second identity.

The second identity includes a first identity and a PLMN ID of an HPLMN of a first terminal, where the first identity is a codeword or mask allocated to a ProSe APP ID by the second ProSe entity, and the first identity includes a PLMN ID of a VPLMN of the first terminal.

1002. The second terminal sends a fifth message to the second ProSe entity according to a PLMN ID of a VPLMN included in the second identity, where the fifth message carries the second identity.

1003. The second ProSe entity receives the fifth message.

1004. The second ProSe entity sends a seventh message to the first ProSe entity according to a PLMN ID of a HPLMN included in the second identity, where the seventh message carries the second identity.

1005. The first ProSe entity receives the seventh message.

1006. The first ProSe entity determines a ProSe APP ID according to the second identity.

1007. The first ProSe entity sends an eighth message to the second ProSe entity, where the eighth message carries the ProSe APP ID.

1008. The second ProSe entity receives the eighth message.

1009. The second ProSe entity sends a sixth message to the second terminal, where the sixth message carries the ProSe APP ID.

1010. The second terminal receives the sixth message.

Specifically, for description of steps 1001 to 1010, reference may be made to related description in Embodiment 1, and details are not described again in this embodiment of the present disclosure.

Based on the foregoing ProSe information transmission method provided in this embodiment of the present disclosure, a first terminal may broadcast a second identity, and the second identity includes a first identity and a PLMN ID of an HPLMN of the first terminal, where the first identity is a codeword or mask allocated to the ProSe APP ID by a second ProSe entity, and the first identity includes a PLMN ID of a VPLMN of the first terminal. In this way, when the first terminal roams to the VPLMN and registers with a network that can be listened on by a second terminal, to perform service broadcasting, because the PLMN ID of the VPLMN broadcast by the first terminal is the same as a PLMN ID of the network that can be listened on by the second terminal, in a process of listening to the codeword of the ProSe APP ID by the second terminal in the network that can be listened on by the second terminal, the PLMN ID of the HPLMN of the first terminal can successfully match the PLMN ID of the network that can be listened on by the second terminal. Therefore, the second terminal obtains, through listening, the codeword that is of the ProSe APP ID and that is broadcast by the first terminal. In addition, the second identity further includes the PLMN ID of the HPLMN of the first terminal. Therefore, after obtaining, through listening, the second identity broadcast by the first terminal, the second terminal may acquire corresponding ProSe application information, for example, information such as an address, a phone number, and/or a discount, according to the second identity. In this way, the second terminal discovers the first terminal.

Figure 9:
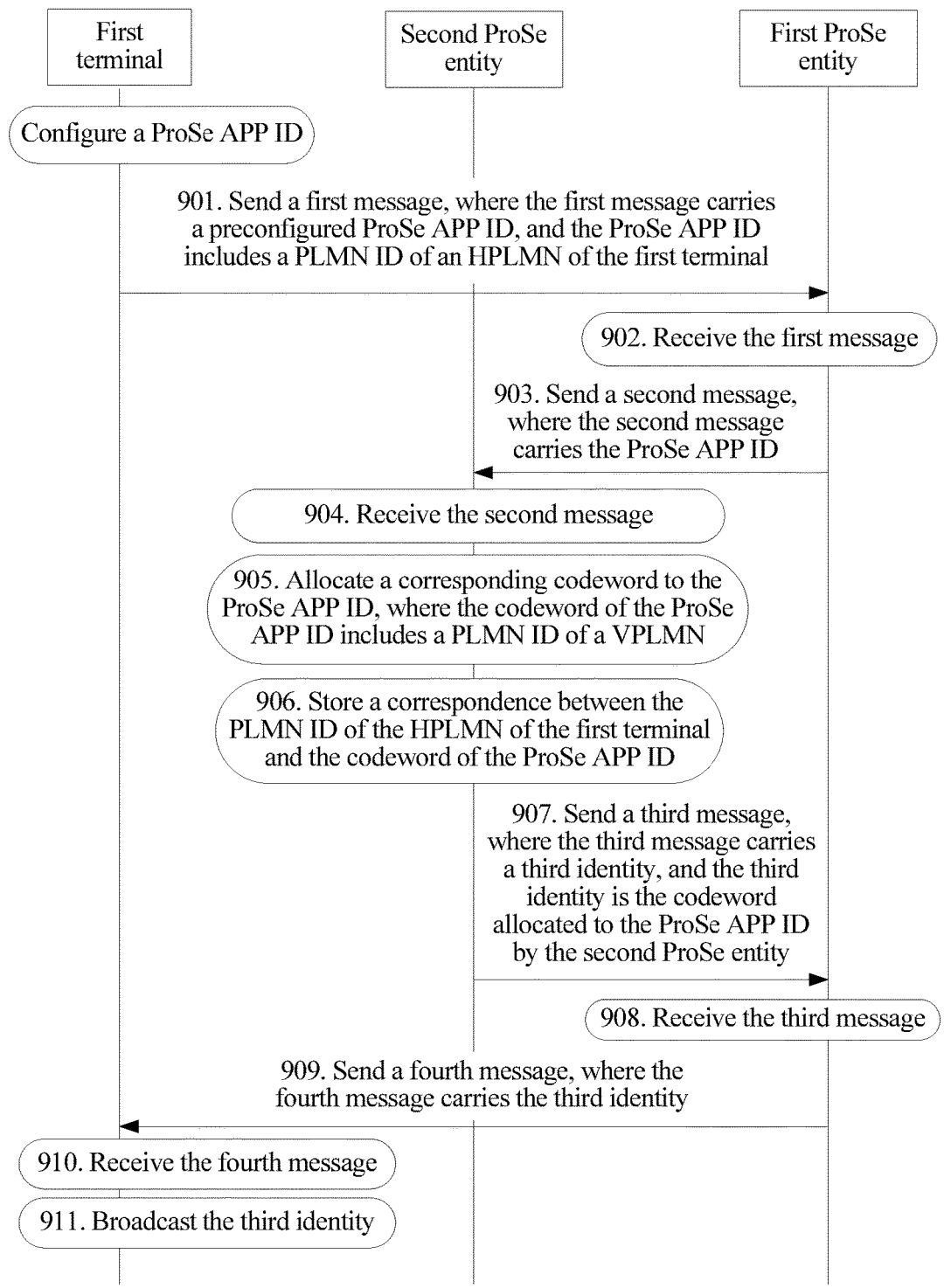
FIG. 9 is a schematic interaction diagram 2 of a ProSe information transmission method according to an embodiment of the present disclosure.

Optionally, this embodiment of the present disclosure further provides a ProSe information transmission method, where interaction between a first terminal, a first ProSe entity, and a second ProSe entity is used as an example for specific description. Specifically, as shown in FIG. 9, the method includes:

901. The first terminal sends a first message to the first ProSe entity, where the first message carries a preconfigured ProSe APP ID, and the ProSe APP ID includes a PLMN ID of an HPLMN of the first terminal.

902. The first ProSe entity receives the first message.

903. The first ProSe entity sends a second message to the second ProSe entity, where the second message carries the ProSe APP ID.

904. The second ProSe entity receives the second message.

905. The second ProSe entity allocates a corresponding codeword to the ProSe APP ID, where the codeword of the ProSe APP ID includes a PLMN ID of a VPLMN.

906. The second ProSe entity stores a correspondence between the PLMN ID of the HPLMN of the first terminal and the codeword of the ProSe APP ID.

907. The second ProSe entity sends a third message to the first ProSe entity, where the third message carries a third identity, and the third identity is the codeword allocated to the ProSe APP ID by the second ProSe entity.

908. The first ProSe entity receives the third message sent by the second ProSe entity.

909. The first ProSe entity sends a fourth message to the first terminal, where the fourth message carries the third identity.

910. The first terminal receives the fourth message.

911. The first terminal broadcasts the third identity.

Specifically, for description of steps 901 to 911, reference may be made to related description in Embodiment 1, and details are not described again in this embodiment of the present disclosure.

It should be noted that, a process of performing broadcasting authentication on the first terminal by the first ProSe entity may further exist between step 902 and step 903. For details, reference may be made to description in Embodiment 1, and details are not described again in this embodiment of the present disclosure.

In addition, a process of performing broadcasting authentication on the first terminal by the second ProSe entity may further exist between step 904 and step 905. For details, reference may be made to description in Embodiment 1, and details are not described again in this embodiment of the present disclosure.

Figure 11:
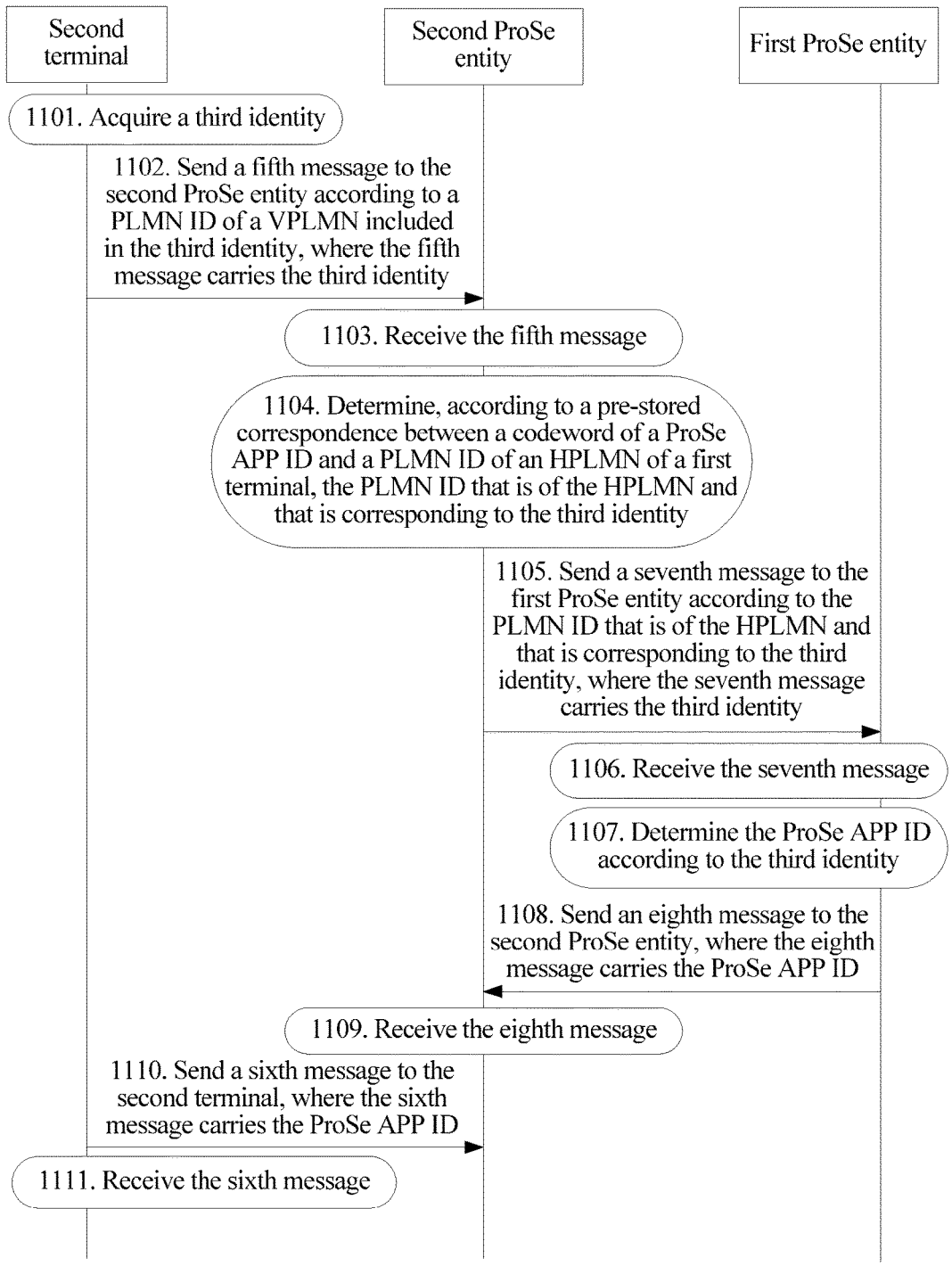
FIG. 11 is a schematic interaction diagram 4 of a ProSe information transmission method according to an embodiment of the present disclosure.

Further, this embodiment of the present disclosure further provides a ProSe information transmission method, where interaction between a second terminal, a first ProSe entity, and a second ProSe entity is used as an example for specific description. Specifically, as shown in FIG. 11, the method includes:

1101. The second terminal acquires a third identity.

The third identity is a codeword allocated to a ProSe APP ID by the second ProSe entity, and the third identity includes a PLMN ID of a VPLMN of a first terminal.

1102. The second terminal sends a fifth message to the second ProSe entity according to a PLMN ID of a VPLMN included in the third identity, where the fifth message carries the third identity.

1103. The second ProSe entity receives the fifth message.

1104. The second ProSe entity determines, according to a pre-stored correspondence between a codeword of a ProSe APP ID and a PLMN ID of an HPLMN of the first terminal, the PLMN ID that is of the HPLMN and that is corresponding to the third identity.

1105. The second ProSe entity sends a seventh message to the first ProSe entity according to the PLMN ID that is of the HPLMN and that is corresponding to the third identity, where the seventh message carries the third identity.

1106. The first ProSe entity receives the seventh message.

1107. The first ProSe entity determines the ProSe APP ID according to the third identity.

1108. The first ProSe entity sends an eighth message to the second ProSe entity, where the eighth message carries the ProSe APP ID.

1109. The second ProSe entity receives the eighth message.

1110. The second ProSe entity sends a sixth message to the second terminal, where the sixth message carries the ProSe APP ID.

1111. The second terminal receives the sixth message.

Specifically, for description of steps 1101 to 1111, reference may be made to related description in Embodiment 3, and details are not described again in this embodiment of the present disclosure.

Based on the foregoing ProSe information transmission method provided in this embodiment of the present disclosure, a first terminal may broadcast a third identity, where the third identity is a codeword allocated to the ProSe APP ID by a second ProSe entity, and the third identity includes a PLMN ID of a VPLMN of the first terminal. In this way, when the first terminal roams to the VPLMN and registers with a network that can be listened on by a second terminal, to perform service broadcasting, because the PLMN ID of the VPLMN broadcast by the first terminal is the same as a PLMN ID of the network that can be listened on by the second terminal, in a process of listening to the codeword of the ProSe APP ID by the second terminal in the network that can be listened on by the second terminal, the PLMN ID of the VPLMN of the first terminal can successfully match the PLMN ID of the network that can be listened on by the second terminal. Therefore, the second terminal obtains, through listening, the codeword that is of the ProSe APP ID and that is broadcast by the first terminal. In addition, the second ProSe entity stores a correspondence between a PLMN ID of an HPLMN of the first terminal and the codeword of the ProSe APP ID. Therefore, after obtaining, through listening, the third identity broadcast by the first terminal, the second terminal may acquire a corresponding ProSe APP ID from a first ProSe entity of the first terminal according to the third identity by using the second ProSe entity with reference to the correspondence, thereby obtaining required ProSe application information, for example, information such as an address, a phone number, and a discount. In this way, the second terminal discovers the first terminal.

Embodiment 3

Figure 12:
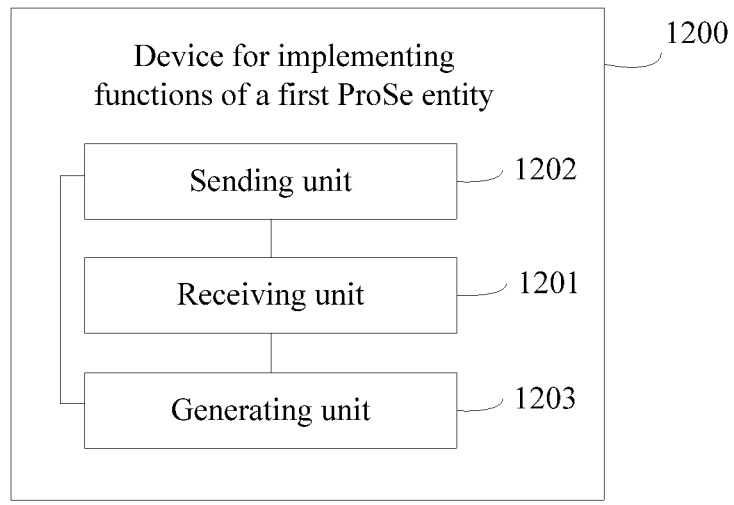
FIG. 12 is a schematic structural diagram of a device for implementing functions of a first ProSe entity according to an embodiment of the present disclosure.

This embodiment of the present disclosure provides a device 1200 for implementing functions of a first proximity service ProSe entity, where the first ProSe entity is a ProSe entity in a home public land mobile network HPLMN of a first terminal. Specifically, as shown in FIG. 12, the device 1200 includes a receiving unit 1201, a sending unit 1202, and a generating unit 1203.

The receiving unit 1201 is configured to receive a first message sent by the first terminal, where the first message carries a ProSe application identity APP ID.

The sending unit 1202 is configured to send a second message to a second ProSe entity, where the second message carries the ProSe APP ID, and the second ProSe entity is a ProSe entity in a visited public land mobile network VPLMN of the first terminal.

The receiving unit 1201 is further configured to receive a third message sent by the second ProSe entity, where the third message carries a first identity, the first identity is a codeword or mask allocated to the ProSe APP ID by the second ProSe entity, and the first identity includes a public land mobile network identity PLMN ID of the VPLMN.

The generating unit 1203 is configured to generate a second identity according to the first identity, where the second identity includes the first identity and a PLMN ID of the HPLMN of the first terminal.

The sending unit 1202 is further configured to send a fourth message to the first terminal, where the fourth message carries the second identity.

Further, if the first identity is the codeword of the ProSe APP ID, the generating unit 1203 is configured to: generate the second identity according to the codeword of the ProSe APP ID, where the second identity includes the codeword of the ProSe APP ID and the PLMN ID of the HPLMN.

Optionally, if the first identity is the mask of the ProSe APP ID, the generating unit 1203 is configured to: allocate a codeword corresponding to the ProSe APP ID to the mask of the ProSe APP ID; and generate the second identity according to the codeword of the ProSe APP ID, where the second identity includes the codeword of the ProSe APP ID and the PLMN ID of the HPLMN.

Further, the first message further carries a first terminal identity of the first terminal.

Figure 13:
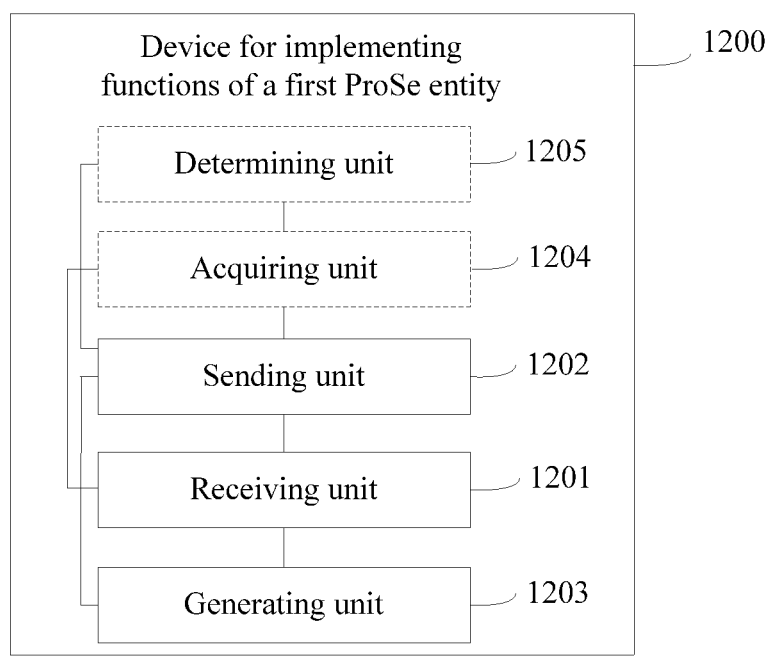
FIG. 13 is a schematic structural diagram of another device for implementing functions of a first ProSe entity according to an embodiment of the present disclosure.

As shown in FIG. 13, the device further includes an acquiring unit 1204 and a determining unit 1205.

The acquiring unit 1204 is configured to acquire first authentication information of the first terminal according to the first terminal identity before the sending unit 1202 sends the second message to the second ProSe entity, where the first authentication information includes information used for indicating whether the first terminal can perform broadcasting.

The determining unit 1205 is configured to determine, according to the first authentication information, that the first terminal can perform broadcasting.

Further, the second message further carries the first terminal identity, so that the second ProSe entity determines, according to the first terminal identity, whether the first terminal can perform broadcasting in the VPLMN.

That the receiving unit 1201 receives the third message sent by the second ProSe entity includes: receiving the third message that is sent by the second ProSe entity in a case in which it is determined that the first terminal can perform broadcasting in the VPLMN.

Further, the acquiring unit 1204 is further configured to acquire roaming indication information before the generating unit 1203 generates the second identity according to the first identity, where the roaming indication information is used for indicating whether the first terminal is in a roaming state.

The determining unit 1205 is configured to: if the roaming indication information indicates that the first terminal is in the roaming state, determine, according to second indication information, that the first terminal supports broadcasting of the second identity, where the second indication information is used for indicating whether the first terminal can support broadcasting of the second identity.

It should be noted that, the device may be an independent device with the functions of the first ProSe entity, or may be a core network device such as a PGW or an MME that bears the functions of the first ProSe entity, which is not specifically limited in this embodiment of the present disclosure.

Specifically, for a method for discovering a terminal by using the device 1200 for implementing the functions of the first proximity service ProSe entity, reference may be made to description in Embodiment 1 or Embodiment 2, and details are not described again in this embodiment of the present disclosure.

Because the device for implementing the functions of the first proximity service ProSe entity in this embodiment can be used to implement the foregoing method, the technical effects arising therefrom may be learned by referring to description in the foregoing embodiment, and details are not described herein again.

Embodiment 4

Figure 14:
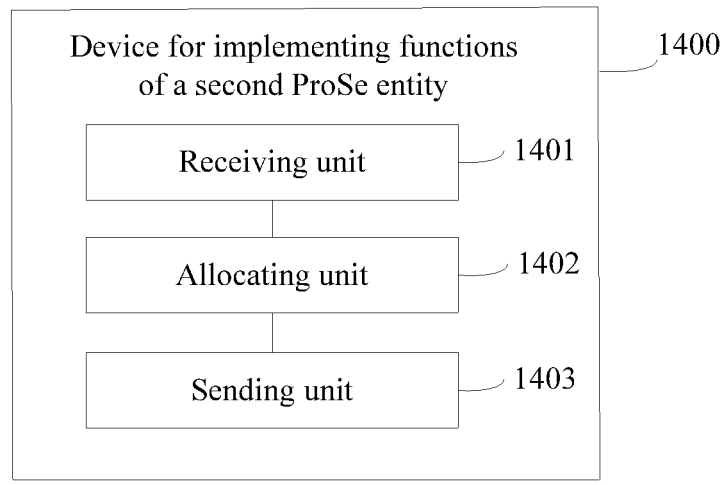
FIG. 14 is a schematic structural diagram of a device for implementing functions of a second ProSe entity according to an embodiment of the present disclosure.

This embodiment of the present disclosure provides a device 1400 for implementing functions of a second proximity service ProSe entity, where the second ProSe entity is a ProSe entity in a visited public land mobile network VPLMN of a first terminal. Specifically, as shown in FIG. 14, the device includes a receiving unit 1401, an allocating unit 1402, and a sending unit 1403.

The receiving unit 1401 is configured to receive a second message sent by a first ProSe entity, where the second message carries a ProSe application identity APP ID, and the first ProSe entity is a ProSe entity in a home public land mobile network HPLMN of the first terminal.

The allocating unit 1402 is configured to allocate a corresponding codeword or mask to the ProSe APP ID, where the codeword or mask of the ProSe APP ID includes a public land mobile network identity PLMN ID of the VPLMN.

The sending unit 1403 is configured to send a third message to the first ProSe entity, where the third message carries a first identity, and the first identity is the codeword or mask allocated to the ProSe APP ID by the second ProSe entity.

Further, the receiving unit 1401 is further configured to receive a fifth message sent by a second terminal after the second terminal acquires a second identity that is generated by the first ProSe entity according to the first identity, where the fifth message carries the second identity, and the second identity includes the first identity and a PLMN ID of the HPLMN of the first terminal.

The sending unit 1403 is further configured to send a seventh message to the first ProSe entity according to the PLMN ID of the HPLMN included in the second identity, where the seventh message carries the second identity.

The receiving unit 1401 is further configured to receive an eighth message that is sent by the first ProSe entity after the first ProSe entity determines the ProSe APP ID according to the second identity, where the eighth message carries the ProSe APP ID.

The sending unit 1403 is further configured to send a sixth message to the second terminal, where the sixth message carries the ProSe APP ID.

Figure 15:
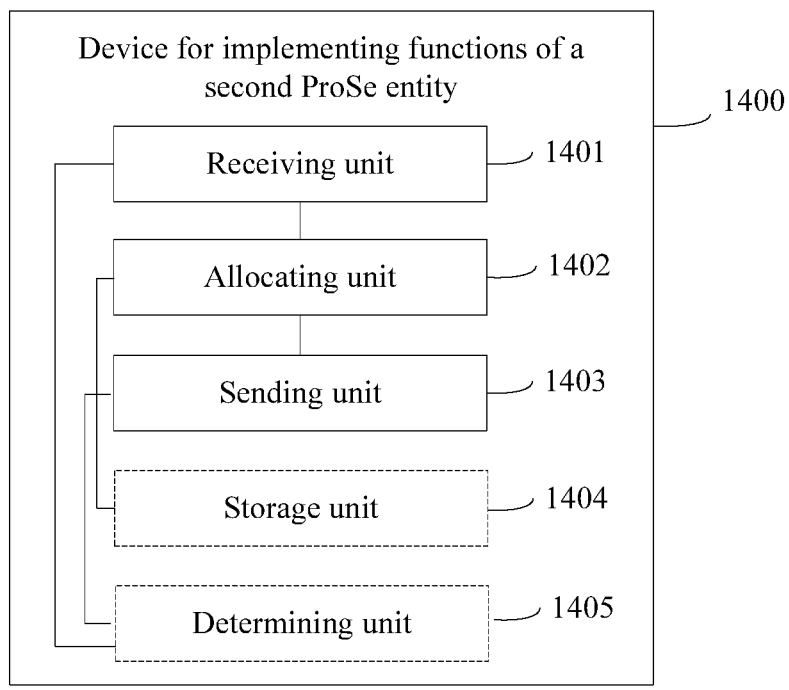
FIG. 15 is a schematic structural diagram of another device for implementing functions of a second ProSe entity according to an embodiment of the present disclosure.

Optionally, the ProSe APP ID includes: a PLMN ID of the HPLMN of the first terminal; and as shown in FIG. 15, the device 1400 further includes a storage unit 1404 and a determining unit 1405.

The storage unit 1404 is configured to store a correspondence between the PLMN ID of the HPLMN of the first terminal and the codeword of the ProSe APP ID after the allocating unit 1402 allocates the corresponding codeword to the ProSe APP ID.

The receiving unit 1401 is further configured to receive a fifth message sent by a second terminal after the second terminal acquires a third identity, where the fifth message carries the third identity, and the third identity is the codeword allocated to the ProSe application identity APP ID by the second ProSe entity.

The determining unit 1405 is configured to determine, according to the correspondence, the PLMN ID that is of the HPLMN and that is corresponding to the third identity.

The sending unit 1403 is configured to send a seventh message to the first ProSe entity according to the PLMN ID that is of the HPLMN and that is corresponding to the third identity, where the seventh message carries the third identity.

The receiving unit 1401 is configured to receive an eighth message that is sent by the first ProSe entity after the first ProSe entity determines the ProSe APP ID according to the third identity, where the eighth message carries the ProSe APP ID.

The sending unit 1403 is configured to send a sixth message to the second terminal, where the sixth message carries the ProSe APP ID.

It should be noted that, the device may be an independent device with the functions of the second ProSe entity, or may be a core network device such as a PGW or an MME that bears the functions of the second ProSe entity, which is not specifically limited in this embodiment of the present disclosure.

Specifically, for a method for discovering a terminal by using the device 1400 for implementing the functions of the second proximity service ProSe entity, reference may be made to description in Embodiment 1 or Embodiment 2, and details are not described again in this embodiment of the present disclosure.

Because the device for implementing the functions of the second proximity service ProSe entity in this embodiment can be used to implement the foregoing method, the technical effects arising therefrom may be learned by referring to description in the foregoing embodiment, and details are not described herein again.

Embodiment 5

Figure 16:
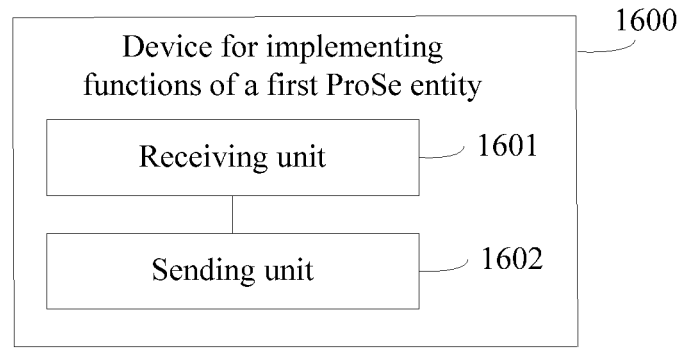
FIG. 16 is a schematic structural diagram of a device for implementing functions of a first ProSe entity according to an embodiment of the present disclosure.

This embodiment of the present disclosure provides a device 1600 for implementing functions of a first proximity service ProSe entity, where the first ProSe entity is a ProSe entity in a home public land mobile network HPLMN of a first terminal. Specifically, as shown in FIG. 16, the device 1600 includes a receiving unit 1601 and a sending unit 1602.

The receiving unit 1601 is configured to receive a first message sent by the first terminal, where the first message carries a ProSe application identity APP ID.

The sending unit 1602 is configured to send a second message to a second ProSe entity, where the second message carries the ProSe APP ID, and the second ProSe entity is a ProSe entity in a visited public land mobile network VPLMN of the first terminal.

The receiving unit 1601 is further configured to receive a third message sent by the second ProSe entity, where the third message carries a third identity, the third identity is a codeword allocated to the ProSe APP ID by the second ProSe entity, and the third identity includes a public land mobile network identity PLMN ID of the VPLMN.

The sending unit 1602 is further configured to send a fourth message to the first terminal, where the fourth message carries the third identity.

It should be noted that, the device may be an independent device with the functions of the first ProSe entity, or may be a core network device such as a PGW or an MME that bears the functions of the first ProSe entity, which is not specifically limited in this embodiment of the present disclosure.

Specifically, for a method for discovering a terminal by using the device 1600 for implementing the functions of the first proximity service ProSe entity, reference may be made to description in Embodiment 1 or Embodiment 2, and details are not described again in this embodiment of the present disclosure.

Because the device for implementing the functions of the first proximity service ProSe entity in this embodiment can be used to implement the foregoing method, the technical effects arising therefrom may be learned by referring to description in the foregoing embodiment, and details are not described herein again.

Embodiment 6

Figure 17:
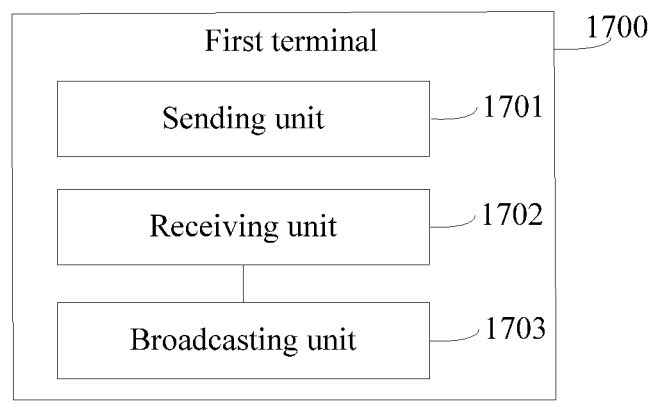
FIG. 17 is a schematic structural diagram of a first terminal according to an embodiment of the present disclosure.

This embodiment of the present disclosure provides a first terminal 1700. Specifically, as shown in FIG. 17, the first terminal 1700 includes a sending unit 1701, a receiving unit 1702, and a broadcasting unit 1703.

The sending unit 1701 is configured to send a first message to a first proximity service ProSe entity, where the first message carries a preconfigured ProSe application identity APP ID, and the first ProSe entity is a ProSe entity in a home public land mobile network HPLMN of the first terminal.

The receiving unit 1702 is configured to receive a fourth message sent by the first ProSe entity, where the fourth message carries a second identity, the second identity includes a first identity and a public land mobile network identity PLMN ID of the HPLMN, the first identity is a codeword or mask allocated to the ProSe APP ID by a second ProSe entity, the first identity includes a PLMN ID of a visited public land mobile network VPLMN of the first terminal, and the second ProSe entity is a ProSe entity in the VPLMN.

The broadcasting unit 1703 is configured to broadcast the second identity.

Further, the first message may further carry first indication information, where the first indication information is used for representing whether the first terminal 1700 can support broadcasting of the second identity.

Specifically, for a method for discovering a terminal by using the first terminal, reference may be made to description in Embodiment 1 or Embodiment 2, and details are not described again in this embodiment of the present disclosure.

Because the first terminal in this embodiment can be used to implement the foregoing method, the technical effects arising therefrom may be learned by referring to description in the foregoing embodiment, and details are not described herein again.

Embodiment 7

Figure 18:
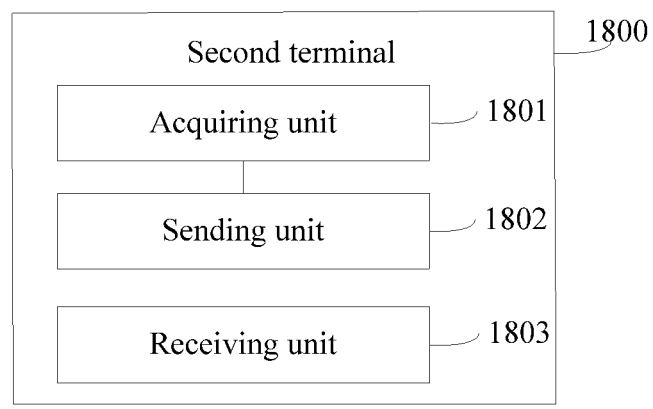
FIG. 18 is a schematic structural diagram of a second terminal according to an embodiment of the present disclosure.

This embodiment of the present disclosure provides a second terminal 1800. Specifically, as shown in FIG. 18, the second terminal 1800 includes an acquiring unit 1801, a sending unit 1802, and a receiving unit 1803.

The acquiring unit 1801 is configured to acquire a second identity, where the second identity includes a first identity and a public land mobile network identity PLMN ID of a home public land mobile network HPLMN of a first terminal, the first identity is a codeword or mask allocated to a ProSe application identity APP ID by a second proximity service ProSe entity, the first identity includes a PLMN ID of a visited public land mobile network VPLMN of the first terminal, and the second ProSe entity is a ProSe entity in the VPLMN.

The sending unit 1802 is configured to send a fifth message to the second ProSe entity according to the PLMN ID of the VPLMN included in the second identity, where the fifth message carries the second identity.

The receiving unit 1803 is configured to receive a sixth message sent by the second ProSe entity, where the sixth message carries the ProSe APP ID, the ProSe APP ID is determined by the first ProSe entity according to the second identity carried in a seventh message that is sent by the second ProSe entity to the first ProSe entity according to the PLMN ID of the HPLMN of the first terminal included in the second identity, and the first ProSe entity is a ProSe entity in the HPLMN of the first terminal.

Specifically, for a method for discovering a terminal by using the second terminal, reference may be made to description in Embodiment 1 or Embodiment 2, and details are not described again in this embodiment of the present disclosure.

Because the second terminal in this embodiment can be used to implement the foregoing method, the technical effects arising therefrom may be learned by referring to description in the foregoing embodiment, and details are not described herein again.

Embodiment 8

Figure 19:
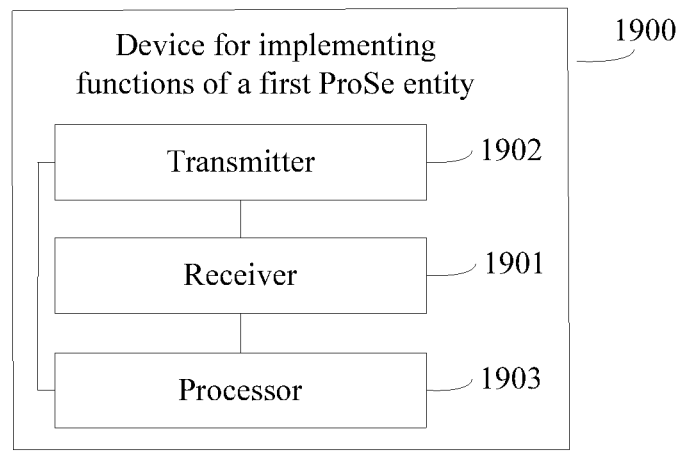
FIG. 19 is a schematic structural diagram of a device for implementing functions of a first ProSe entity according to an embodiment of the present disclosure.

This embodiment of the present disclosure provides a device 1900 for implementing functions of a first proximity service ProSe entity, where the first ProSe entity is a ProSe entity in a home public land mobile network HPLMN of a first terminal. Specifically, as shown in FIG. 19, the device 1900 includes a receiver 1901, a transmitter 1902, and a processor 1903.

The receiver 1901 is configured to receive a first message sent by the first terminal, where the first message carries a ProSe application identity APP ID.

The transmitter 1902 is configured to send a second message to a second ProSe entity, where the second message carries the ProSe APP ID, and the second ProSe entity is a ProSe entity in a visited public land mobile network VPLMN of the first terminal.

The receiver 1901 is further configured to receive a third message sent by the second ProSe entity, where the third message carries a first identity, the first identity is a codeword or mask allocated to the ProSe APP ID by the second ProSe entity, and the first identity includes a public land mobile network identity PLMN ID of the VPLMN.

The processor 1903 is configured to generate a second identity according to the first identity, where the second identity includes the first identity and a PLMN ID of the HPLMN of the first terminal.

The transmitter 1902 is further configured to send a fourth message to the first terminal, where the fourth message carries the second identity.

Further, if the first identity is the codeword of the ProSe APP ID, the processor 1903 is configured to: generate the second identity according to the codeword of the ProSe APP ID, where the second identity includes the codeword of the ProSe APP ID and the PLMN ID of the HPLMN.

Optionally, if the first identity is the mask of the ProSe APP ID, the processor 1903 is configured to: allocate a codeword corresponding to the ProSe APP ID to the mask of the ProSe APP ID; and generate the second identity according to the codeword of the ProSe APP ID, where the second identity includes the codeword of the ProSe APP ID and the PLMN ID of the HPLMN.

Further, the first message further carries a first terminal identity of the first terminal.

The processor 1903 is further configured to acquire first authentication information of the first terminal according to the first terminal identity before the transmitter 1902 sends the second message to the second ProSe entity, where the first authentication information includes information used for indicating whether the first terminal can perform broadcasting.

The processor 1903 is further configured to determine, according to the first authentication information, that the first terminal can perform broadcasting.

Further, the second message further carries the first terminal identity, so that the second ProSe entity determines, according to the first terminal identity, whether the first terminal can perform broadcasting in the VPLMN.

The receiver 1901 is configured to: receive the third message that is sent by the second ProSe entity in a case in which it is determined that the first terminal can perform broadcasting in the VPLMN.

Further, the processor 1903 is further configured to acquire roaming indication information before the second identity is generated according to the first identity, where the roaming indication information is used for indicating whether the first terminal is in a roaming state.

The processor 1903 is further configured to: if the roaming indication information indicates that the first terminal is in the roaming state, determine, according to second indication information, that the first terminal supports broadcasting of the second identity, where the second indication information is used for indicating whether the first terminal can support broadcasting of the second identity.

It should be noted that, the device may be an independent device with the functions of the first ProSe entity, or may be a core network device such as a PGW or an MME that bears the functions of the first ProSe entity, which is not specifically limited in this embodiment of the present disclosure.

Specifically, for a method for discovering a terminal by using the device for implementing the functions of the first proximity service ProSe entity, reference may be made to description in Embodiment 1 or Embodiment 2, and details are not described again in this embodiment of the present disclosure.

Because the device for implementing the functions of the first proximity service ProSe entity in this embodiment can be used to implement the foregoing method, the technical effects arising therefrom may be learned by referring to description in the foregoing embodiment, and details are not described herein again.

Embodiment 9

Figure 20:
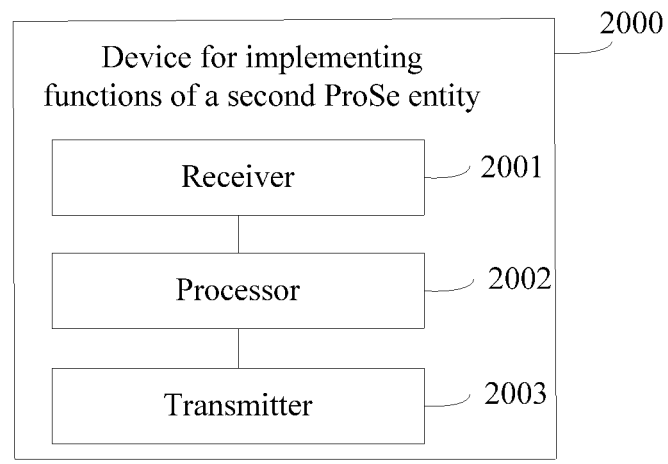
FIG. 20 is a schematic structural diagram of a device for implementing functions of a second ProSe entity according to an embodiment of the present disclosure.

This embodiment of the present disclosure provides a device 2000 for implementing functions of a second proximity service ProSe entity, where the second ProSe entity is a ProSe entity in a visited public land mobile network VPLMN of a first terminal. Specifically, as shown in FIG. 20, the device 2000 includes a receiver 2001, a processor 2002, and a transmitter 2003.

The receiver 2001 is configured to receive a second message sent by a first ProSe entity, where the second message carries a ProSe application identity APP ID, and the first ProSe entity is a ProSe entity in a home public land mobile network HPLMN of the first terminal.

The processor 2002 is configured to allocate a corresponding codeword or mask to the ProSe APP ID, where the codeword or mask of the ProSe APP ID includes a public land mobile network identity PLMN ID of the VPLMN.

The transmitter 2003 is configured to send a third message to the first ProSe entity, where the third message carries a first identity, and the first identity is the codeword or mask allocated to the ProSe APP ID by the second ProSe entity.

Further, the receiver 2001 is further configured to receive a fifth message sent by a second terminal after the second terminal acquires a second identity that is generated by the first ProSe entity according to the first identity, where the fifth message carries the second identity, and the second identity includes the first identity and a PLMN ID of the HPLMN of the first terminal.

The transmitter 2003 is further configured to send a seventh message to the first ProSe entity according to the PLMN ID of the HPLMN included in the second identity, where the seventh message carries the second identity.

The receiver 2001 is further configured to receive an eighth message that is sent by the first ProSe entity after the first ProSe entity determines the ProSe APP ID according to the second identity, where the eighth message carries the ProSe APP ID.

The transmitter 2003 is further configured to send a sixth message to the second terminal, where the sixth message carries the ProSe APP ID.

Figure 21:
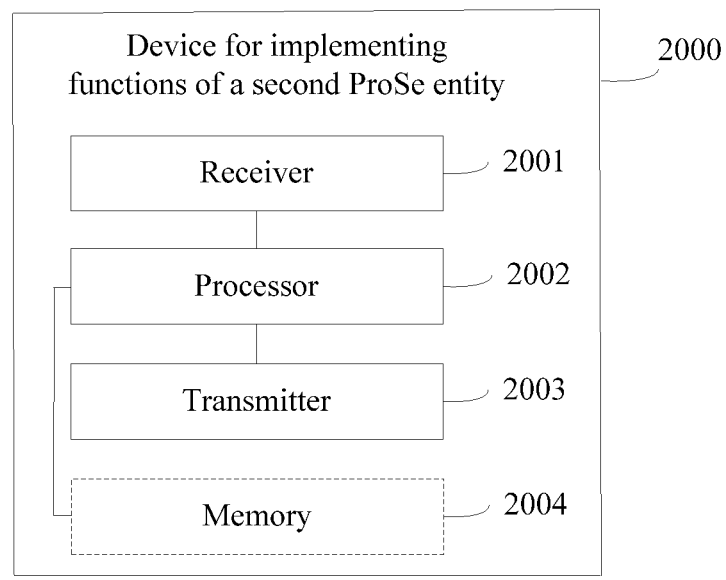
FIG. 21 is a schematic structural diagram of another device for implementing functions of a second ProSe entity according to an embodiment of the present disclosure.

Optionally, the ProSe APP ID includes: a PLMN ID of the HPLMN of the first terminal; and as shown in FIG. 21, the device 2000 further includes a memory 2004.

The memory 2004 is configured to store a correspondence between the PLMN ID of the HPLMN of the first terminal and the codeword of the ProSe APP ID after the processor 2002 allocates the corresponding codeword to the ProSe APP ID.

The receiver 2001 is further configured to receive a fifth message sent by a second terminal after the second terminal acquires a third identity, where the fifth message carries the third identity, and the third identity is the codeword allocated to the ProSe application identity APP ID by the second ProSe entity.

The processor 2002 is further configured to determine, according to the correspondence, the PLMN ID that is of the HPLMN and that is corresponding to the third identity.

The transmitter 2003 is further configured to send a seventh message to the first ProSe entity according to the PLMN ID that is of the HPLMN and that is corresponding to the third identity, where the seventh message carries the third identity.

The receiver 2001 is further configured to receive an eighth message that is sent by the first ProSe entity after the first ProSe entity determines the ProSe APP ID according to the third identity, where the eighth message carries the ProSe APP ID.

The transmitter 2003 is further configured to send a sixth message to the second terminal, where the sixth message carries the ProSe APP ID.

It should be noted that, the device may be an independent device with the functions of the second ProSe entity, or may be a core network device such as a PGW or an MME that bears the functions of the second ProSe entity, which is not specifically limited in this embodiment of the present disclosure.

Specifically, for a method for discovering a terminal by using the device for implementing the functions of the second proximity service ProSe entity, reference may be made to description in Embodiment 1 or Embodiment 2, and details are not described again in this embodiment of the present disclosure.

Because the device for implementing the functions of the second proximity service ProSe entity in this embodiment can be used to implement the foregoing method, the technical effects arising therefrom may be learned by referring to description in the foregoing embodiment, and details are not described herein again.

Embodiment 10

Figure 22:
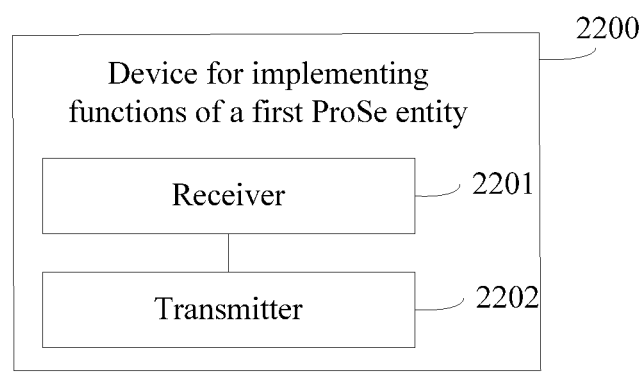
FIG. 22 is a schematic structural diagram of a device for implementing functions of a first ProSe entity according to an embodiment of the present disclosure.

This embodiment of the present disclosure provides a device 2200 for implementing functions of a first proximity service ProSe entity, where the first ProSe entity is a ProSe entity in a HPLMN of a first terminal. Specifically, as shown in FIG. 22, the device 2200 includes a receiver 2201 and a transmitter 2202.

The receiver 2201 is configured to receive a first message sent by the first terminal, where the first message carries a ProSe application identity APP ID.

The transmitter 2202 is configured to send a second message to a second ProSe entity, where the second message carries the ProSe APP ID, and the second ProSe entity is a ProSe entity in a visited public land mobile network VPLMN of the first terminal.

The receiver 2201 is further configured to receive a third message sent by the second ProSe entity, where the third message carries a third identity, the third identity is a codeword allocated to the ProSe APP ID by the second ProSe entity, and the third identity includes a public land mobile network identity PLMN ID of the VPLMN.

The transmitter 2202 is further configured to send a fourth message to the first terminal, where the fourth message carries the third identity.

It should be noted that, the device may be an independent device with the functions of the first ProSe entity, or may be a core network device such as a PGW or an MME that bears the functions of the first ProSe entity, which is not specifically limited in this embodiment of the present disclosure.

Specifically, for a method for discovering a terminal by using the device for implementing the functions of the first proximity service ProSe entity, reference may be made to description in Embodiment 1 or Embodiment 2, and details are not described again in this embodiment of the present disclosure.

Because the device for implementing the functions of the first proximity service ProSe entity in this embodiment can be used to implement the foregoing method, the technical effects arising therefrom may be learned by referring to description in the foregoing embodiment, and details are not described herein again.

Embodiment 11

Figure 23:
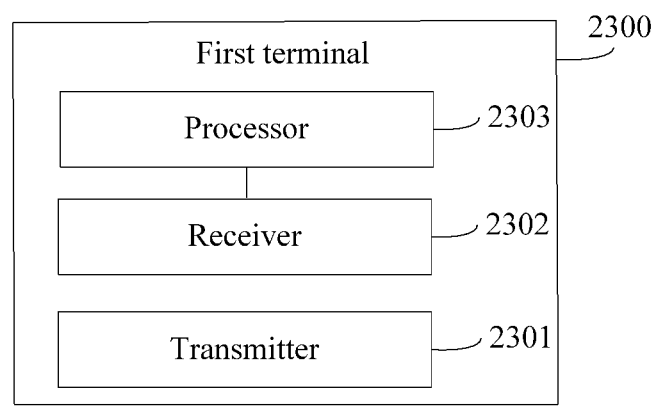
FIG. 23 is a schematic structural diagram of a first terminal according to an embodiment of the present disclosure.

This embodiment of the present disclosure provides a first terminal 2300. Specifically, as shown in FIG. 23, the first terminal 2300 includes a transmitter 2301, a receiver 2302, and a processor 2303.

The transmitter 2301 is configured to send a first message to a first proximity service ProSe entity, where the first message carries a preconfigured ProSe application identity APP ID, and the first ProSe entity is a ProSe entity in a home public land mobile network HPLMN of the first terminal.

The receiver 2302 is configured to receive a fourth message sent by the first ProSe entity, where the fourth message carries a second identity, the second identity includes a first identity and a public land mobile network identity PLMN ID of the HPLMN, the first identity is a codeword or mask allocated to the ProSe APP ID by a second ProSe entity, the first identity includes a PLMN ID of a visited public land mobile network VPLMN of the first terminal, and the second ProSe entity is a ProSe entity in the VPLMN.

The processor 2303 is configured to broadcast the second identity.

Further, the first message may further carry first indication information, where the first indication information is used for representing whether the first terminal 2300 supports broadcasting of the second identity.

Specifically, for a method for discovering a terminal by using the first terminal, reference may be made to description in Embodiment 1 or Embodiment 2, and details are not described again in this embodiment of the present disclosure.

Because the first terminal in this embodiment can be used to implement the foregoing method, the technical effects arising therefrom may be learned by referring to description in the foregoing embodiment, and details are not described herein again.

Embodiment 12

Figure 24:
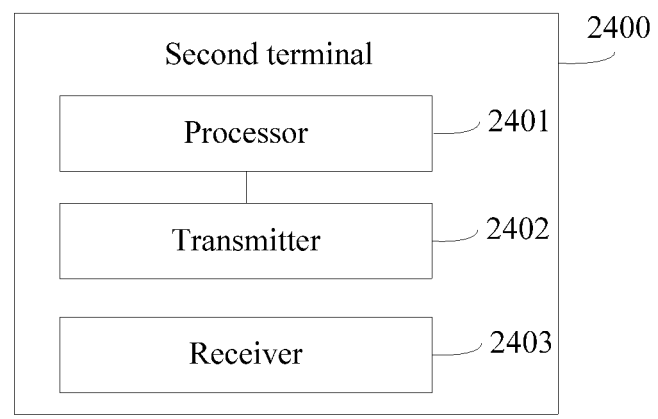
FIG. 24 is a schematic structural diagram of a second terminal according to an embodiment of the present disclosure.

This embodiment of the present disclosure provides a second terminal 2400. Specifically, as shown in FIG. 24, the second terminal 2400 includes a processor 2401, a transmitter 2402, and a receiver 2403.

The processor 2401 is configured to acquire a second identity, where the second identity includes a first identity and a public land mobile network identity PLMN ID of a home public land mobile network HPLMN of a first terminal, the first identity is a codeword or mask allocated to a ProSe application identity APP ID by a second proximity service ProSe entity, the first identity includes a PLMN ID of a visited public land mobile network VPLMN of the first terminal, and the second ProSe entity is a ProSe entity in the VPLMN.

The transmitter 2402 is configured to send a fifth message to the second ProSe entity according to the PLMN ID of the VPLMN included in the second identity, where the fifth message carries the second identity.

The receiver 2403 is configured to receive a sixth message sent by the second ProSe entity, where the sixth message carries the ProSe APP ID, the ProSe APP ID is determined by the first ProSe entity according to the second identity carried in a seventh message that is sent by the second ProSe entity to the first ProSe entity according to the PLMN ID of the HPLMN of the first terminal included in the second identity, and the first ProSe entity is a ProSe entity in the HPLMN of the first terminal.

Specifically, for a method for discovering a terminal by using the second terminal, reference may be made to description in Embodiment 1 or Embodiment 2, and details are not described again in this embodiment of the present disclosure.

Because the second terminal in this embodiment can be used to implement the foregoing method, the technical effects arising therefrom may be learned by referring to description in the foregoing embodiment, and details are not described herein again.

It may be clearly understood by a person skilled in the art that, for the purpose of convenient and brief description, division of the foregoing functional modules is taken as an example for illustrating the apparatus described above. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present disclosure. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A proximity service (ProSe) information transmission method implemented by a first ProSe entity, the method comprising:
    receiving from a first terminal a first message comprising a ProSe application identity (APP ID), wherein the first ProSe entity is in a home public land mobile network (HPLMN) of the first terminal;
    sending to a second ProSe entity a second message comprising the ProSe APP ID, wherein the second ProSe entity is in a visited public land mobile network (VPLMN) of the first terminal;
    receiving from the second ProSe entity a third message comprising a first identity, wherein the first identity is a codeword or a mask allocated to the ProSe APP ID by the second ProSe entity and comprises a first public land mobile network identity (PLMN ID) of the VPLMN;
    generating a second identity according to the first identity, wherein the second identity comprises the first identity and a second PLMN ID of the HPLMN; and
    sending to the first terminal a fourth message comprising the second identity, wherein, before the generating the second identity, the method further comprises:
        acquiring first indication information indicating whether the first terminal is in a roaming state; and
        determining, according to second indication information and when the first indication information indicates that the first terminal is in the roaming state, that the first terminal supports broadcasting of the second identity, wherein the second indication information indicates whether the first terminal can support broadcasting of the second identity.

2. The method of claim 1, wherein, when the first identity is the codeword, the generating the second identity comprises generating the second identity according to the codeword, and wherein the second identity comprises the codeword and the second PLMN ID.

3. The method of claim 1, wherein, when the first identity is the mask, wherein the generating the second identity comprises allocating the codeword to the mask and generating the second identity according to the codeword, and wherein the second identity comprises the codeword and the second PLMN ID.

4. The method of claim 1, wherein the first message further comprises a first terminal identity of the first terminal, and wherein, before the sending the second message, the method further comprises:
    acquiring first authentication information of the first terminal according to the first terminal identity, wherein the first authentication information indicates whether the first terminal can perform broadcasting; and
    determining, according to the first authentication information, that the first terminal can perform broadcasting.

5. The method of claim 4, wherein the second message further comprises the first terminal identity for the second ProSe entity to determine, according to the first terminal identity, whether the first terminal can perform broadcasting in the VPLMN, and wherein the receiving the third message comprises receiving the third message when the second ProSe entity determines that the first terminal can perform broadcasting in the VPLMN.

6. A proximity service (ProSe) information transmission method implemented by a second ProSe entity, the method comprising:
    receiving from a first ProSe entity a second message comprising a ProSe application identity (APP ID), wherein the first ProSe entity is in a home public land mobile network (HPLMN) of a first terminal, and wherein the second ProSe entity is in a visited public land mobile network (VPLMN) of the first terminal;

allocating a corresponding codeword or a mask to the ProSe APP ID, wherein the codeword or the mask comprises a first public land mobile network identity (PLMN ID) of the VPLMN;

sending to the first ProSe entity a third message comprising a first identity, wherein the first identity is the codeword or the mask;

receiving, from a second terminal after the second terminal acquires a second identity generated by the first ProSe entity according to the first identity, a fifth message comprising the second identity, wherein the second identity comprises the first identity and a second PLMN ID of the HPLMN;

sending to the first ProSe entity and according to the second PLMN ID, a seventh message comprising the second identity;

receiving, from the first ProSe entity after the first ProSe entity determines the ProSe APP ID according to the second identity, an eighth message comprising the ProSe APP ID; and sending to the second terminal a sixth message comprising the ProSe APP ID.

7. The method of claim 6, wherein the ProSe APP ID comprises a second PLMN ID of the HPLMN, and wherein, after the allocating the corresponding codeword or the mask, the method further comprises:

storing a correspondence between the second PLMN ID and the codeword;

receiving, from a second terminal after the second terminal acquires a third identity, a fifth message comprising the third identity, wherein the third identity is the codeword;

determining the second PLMN ID according to the correspondence;

sending, according to the second PLMN ID, a seventh message comprising the third identity;

receiving, from the first ProSe entity after the first ProSe entity determines the ProSe APP ID according to the third identity, an eighth message comprising the ProSe APP ID; and sending to the second terminal a sixth message comprising the ProSe APP ID.

8. A first proximity service (ProSe) entity comprising:

a processor;

a receiver coupled to the processor and configured to receive from a first terminal a first message comprising a ProSe application identity (APP ID), wherein the first ProSe entity is in a home public land mobile network (HPLMN) of the first terminal; and a transmitter coupled to the processor and configured to transmit to a second ProSe entity a second message comprising the ProSe APP ID, wherein the second ProSe entity is in a visited public land mobile network (VPLMN) of the first terminal, wherein the receiver is further configured to receive from the second ProSe entity a third message comprising a first identity, wherein the first identity is a codeword or a mask allocated to the ProSe APP ID by the second ProSe entity, and wherein the first identity comprises a first public land mobile network identity (PLMN ID) of the VPLMN, wherein the processor is configured to generate, according to the first identity, a second identity comprising the first identity and a second PLMN ID of the HPLMN of the first terminal, wherein the transmitter is further configured to transmit to the first terminal a fourth message comprising the second identity, and wherein the processor is further configured to:

acquire, before the generating the second identity, first indication information indicating whether the first terminal is in a roaming state; and determine, according to second indication information and when the first indication information indicates that the first terminal is in the roaming state, that the first terminal supports broadcasting of the second identity, wherein the second indication information indicates whether the first terminal can support broadcasting of the second identity.

9. The first ProSe entity of claim 8, wherein, when the first identity is the codeword, the processor is further configured to generate the second identity according to the codeword, and wherein the second identity comprises the codeword and the second PLMN ID.

10. The first ProSe entity of claim 8, wherein, when the first identity is the mask, the processor is further configured to:

allocate the codeword to the mask; and generate the second identity according to the codeword, wherein the second identity comprises the codeword and the second PLMN ID.

11. The first ProSe entity of claim 8, wherein the first message further comprises a first terminal identity of the first terminal, and wherein the processor is further configured to:

acquire, before the transmitter transmits the second message, first authentication information of the first terminal according to the first terminal identity, wherein the first authentication information indicates whether the first terminal can perform broadcasting; and determine, according to the first authentication information, that the first terminal can perform broadcasting.

12. The first ProSe entity of claim 11, wherein the second message further comprises the first terminal identity for the second ProSe entity to determine, according to the first terminal identity, whether the first terminal can perform broadcasting in the VPLMN, and wherein the receiver is further configured to receive the third message when it is determined that the first terminal can perform broadcasting in the VPLMN.

* * * * *